(12) United States Patent
Jayaramachar et al.

(10) Patent No.: US 11,871,309 B2
(45) Date of Patent: Jan. 9, 2024

(54) METHODS, SYSTEMS, AND COMPUTER READABLE MEDIA FOR NETWORK FUNCTION DISCOVERY USING PREFERRED-LOCALITY INFORMATION

(71) Applicant: Oracle International Corporation, Redwood Shores, CA (US)

(72) Inventors: Amarnath Jayaramachar, Bangalore (IN); Jay Rajput, Bangalore (IN); Virendra Singh, Bangalore (IN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 75 days.

(21) Appl. No.: 17/487,142

(22) Filed: Sep. 28, 2021

(65) Prior Publication Data
US 2023/0099676 A1    Mar. 30, 2023

(51) Int. Cl.
*H04W 4/23* (2018.01)
*H04W 4/02* (2018.01)
*H04W 84/04* (2009.01)

(52) U.S. Cl.
CPC .............. *H04W 4/23* (2018.02); *H04W 4/025* (2013.01); *H04W 84/042* (2013.01)

(58) Field of Classification Search
CPC ..... H04L 29/08; H04L 67/322; H04L 67/101; H04L 67/16; H04L 67/2809;
(Continued)

(56) References Cited

U.S. PATENT DOCUMENTS 6,014,558 A    1/2000   Thomas
8,069,101 B1   11/2011   von Groll et al.
(Continued)

FOREIGN PATENT DOCUMENTS

EP           3 716 692 A1    9/2020
WO   WO 2019/144321 A1   1/2019
(Continued)

OTHER PUBLICATIONS

Methods And Systems For Handling NF Component Exceptions And Devices; KR 20190088060 A; Ma Jingwang (Year: 2019).*
(Continued)

*Primary Examiner* — Meless N Zewdu
(74) *Attorney, Agent, or Firm* — Jenkins, Taylor & Hunt, P.A.

(57) ABSTRACT

Methods, systems, and computer readable media for network function (NF) discovery using preferred-locality information are disclosed. One example method for NF discovery using preferred-locality information comprises: at a first NF comprising at least one processor: receiving a message relating to a transaction involving a consumer NF; identifying, from the message, an NF instance identifier (ID) corresponding to the consumer NF; determining, using the NF instance ID and a data store including NF related information and corresponding preferred-locality information, a preferred-locality value; including the preferred-locality value in a preferred-locality information element (IE) of an NF discovery request; and transmitting the NF discovery request toward a second NF.

12 Claims, 13 Drawing Sheets

(58) Field of Classification Search
CPC ..... H04L 12/801; H04L 67/51; H04L 67/562; H04L 67/568; H04L 29/12; H04L 12/24; H04L 67/1061; H04L 67/1063; H04L 67/1065; H04W 4/50; H04W 4/02; H04W 48/00; H04W 60/00; H04W 48/16; H04W 48/18; H04W 4/20; H04W 8/00; H04W 8/005; H04W 48/08; H04W 72/00; H04W 72/02; H04W 76/00; H04W 76/10; H04W 76/11; H04W 88/00; H04W 88/02; H04W 88/08; H04W 88/18; H04W 64/00; H04W 64/003; H04W 48/17; H04W 48/20; H04W 4/029; H04W 4/021; H04W 4/023; H04W 4/024; H04W 4/14; H04W 8/18; H04W 8/20; H04W 8/14; H04W 84/042; G06F 17/30

See application file for complete search history.

(56) References Cited

U.S. PATENT DOCUMENTS

| | | | |
|---|---|---|---|
| 8,069,181 B1 | 11/2011 | Krishan et al. | |
| 9,124,537 B2 | 9/2015 | Kolze | |
| 9,246,762 B1 | 1/2016 | Watkins | |
| 10,313,362 B2 | 6/2019 | Ahuja et al. | |
| 10,609,530 B1 | 3/2020 | Patil et al. | |
| 10,637,753 B1 | 4/2020 | Taft et al. | |
| 10,686,667 B1 | 6/2020 | Subramaniam | |
| 10,772,062 B1 | 9/2020 | Albasheir et al. | |
| 11,109,307 B2 | 8/2021 | Rodrigo et al. | |
| 11,271,846 B2 | 3/2022 | Krishan | |
| 11,470,544 B2* | 10/2022 | Singh et al. | H04W 48/18 |
| 11,483,694 B2* | 10/2022 | Krishan | H04W 8/005 |
| 11,496,954 B2* | 11/2022 | Gupta et al. | H04W 48/16 |
| 11,528,334 B2* | 12/2022 | Krishan | H04L 67/51 |
| 11,570,262 B2* | 1/2023 | Sapra et al. | H04L 67/51 |
| 11,589,298 B2* | 2/2023 | Sapra et al. | H04W 48/18 |
| 11,652,895 B1 | 5/2023 | Sapra et al. | |
| 2005/0181776 A1 | 8/2005 | Verma et al. | |
| 2005/0193096 A1 | 9/2005 | Yu et al. | |
| 2006/0010224 A1 | 1/2006 | Sekar et al. | |
| 2007/0050331 A1 | 3/2007 | Bauman et al. | |
| 2008/0101293 A1 | 5/2008 | Woo et al. | |
| 2009/0222584 A1 | 9/2009 | Josefsberg et al. | |
| 2013/0086245 A1 | 4/2013 | Lu et al. | |
| 2013/0198269 A1 | 8/2013 | Fleischman et al. | |
| 2013/0272123 A1 | 10/2013 | Lee et al. | |
| 2014/0040975 A1 | 2/2014 | Raleigh et al. | |
| 2016/0156513 A1 | 6/2016 | Zhang et al. | |
| 2016/0350683 A1 | 12/2016 | Bester et al. | |
| 2016/0380906 A1 | 12/2016 | Hodique et al. | |
| 2017/0077751 A1 | 3/2017 | Forbes | |
| 2017/0221015 A1 | 8/2017 | June et al. | |
| 2018/0205637 A1 | 7/2018 | Li | |
| 2018/0262625 A1 | 9/2018 | McCarley et al. | |
| 2018/0285794 A1 | 10/2018 | Gray-Donald et al. | |
| 2018/0324247 A1 | 11/2018 | Hood et al. | |
| 2019/0007366 A1 | 1/2019 | Voegele et al. | |
| 2019/0140895 A1 | 5/2019 | Ennis, Jr. et al. | |
| 2019/0158364 A1 | 5/2019 | Zhang et al. | |
| 2019/0166001 A1* | 5/2019 | Ma et al. | H04L 41/0893 |
| 2019/0222633 A1 | 7/2019 | Howes et al. | |
| 2019/0230556 A1 | 7/2019 | Lee | |
| 2019/0342229 A1 | 11/2019 | Khinvasara et al. | |
| 2019/0394284 A1 | 12/2019 | Baghel et al. | |
| 2020/0036754 A1 | 1/2020 | Livanos | |
| 2020/0059420 A1 | 2/2020 | Abraham | |
| 2020/0106812 A1 | 4/2020 | Verma et al. | |
| 2020/0127916 A1* | 4/2020 | Krishan | H04L 45/126 |
| 2020/0136911 A1 | 4/2020 | Assali et al. | |
| 2020/0137174 A1 | 4/2020 | Stammers et al. | |
| 2020/0305033 A1* | 9/2020 | Keller et al. | H04W 36/0022 |
| 2020/0314615 A1 | 10/2020 | Patil et al. | |
| 2020/0336554 A1 | 10/2020 | Deshpande et al. | |
| 2020/0367148 A1* | 11/2020 | Baek et al. | H04W 48/16 |
| 2021/0007023 A1 | 1/2021 | Umapathy et al. | |
| 2021/0044481 A1 | 2/2021 | Xu et al. | |
| 2021/0076248 A1 | 3/2021 | Kallam et al. | |
| 2021/0099856 A1* | 4/2021 | Cakulev et al. | H04W 8/005 |
| 2021/0136602 A1 | 5/2021 | Pokkunuri et al. | |
| 2021/0168055 A1 | 6/2021 | Lair | |
| 2021/0204200 A1 | 7/2021 | Krishan et al. | |
| 2021/0235254 A1 | 7/2021 | Farooq | |
| 2021/0273977 A1 | 9/2021 | Karasaridis et al. | |
| 2021/0274392 A1 | 9/2021 | Dao et al. | |
| 2021/0297935 A1 | 9/2021 | Belling et al. | |
| 2021/0367916 A1 | 11/2021 | Belling et al. | |
| 2021/0368427 A1 | 11/2021 | Rommer et al. | |
| 2021/0385286 A1 | 12/2021 | Wang et al. | |
| 2021/0385732 A1* | 12/2021 | Reyes et al. | H04W 48/16 |
| 2022/0038545 A1 | 2/2022 | Krishan | |
| 2022/0070648 A1* | 3/2022 | Krishan | H04W 8/005 |
| 2022/0103644 A1* | 3/2022 | Park et al. | H04L 67/16 |
| 2022/0110082 A1 | 4/2022 | Belling et al. | |
| 2022/0131945 A1 | 4/2022 | Sapra et al. | |
| 2022/0159464 A1* | 5/2022 | Rajput et al. | H04W 12/08 |
| 2022/0191294 A1 | 6/2022 | Yang et al. | |
| 2022/0264432 A1 | 8/2022 | Reyes et al. | |
| 2022/0286949 A1* | 9/2022 | Sapra et al. | H04W 48/18 |
| 2022/0295384 A1 | 9/2022 | Gupta et al. | |
| 2022/0330085 A1* | 10/2022 | Li | H04W 28/0289 |
| 2022/0346188 A1 | 10/2022 | Malhotra | |
| 2022/0394453 A1 | 12/2022 | Goel | |
| 2022/0394597 A1 | 12/2022 | Goel | |
| 2022/0417783 A1 | 12/2022 | Srivastava et al. | |
| 2023/0052267 A1 | 2/2023 | Goel et al. | |
| 2023/0096969 A1 | 3/2023 | Sapra et al. | |
| 2023/0179681 A1 | 6/2023 | Krishan | |

FOREIGN PATENT DOCUMENTS

| | | | |
|---|---|---|---|
| WO | WO 2019/076276 A1 | 4/2019 | |
| WO | WO 2019/215308 A1 | 11/2019 | |
| WO | WO 2020/001842 A1 | 1/2020 | |
| WO | WO 2020/030291 A1 | 2/2020 | |
| WO | WO 2020/083516 A1 | 4/2020 | |
| WO | WO 2020/192254 A1 | 10/2020 | |
| WO | WO 2021/011933 A1 | 1/2021 | |
| WO | WO 2021/092441 A1 | 5/2021 | |
| WO | WO 2021/110287 A1* | 6/2021 | H04L 29/08 |
| WO | WO 2022/025987 A1 | 2/2022 | |
| WO | WO 2022/050987 A1 | 3/2022 | |
| WO | WO 2022/093319 A1 | 5/2022 | |
| WO | WO 2022152870 A1 | 7/2022 | |
| WO | WO 2022/179713 A1 | 9/2022 | |
| WO | WO 2022/197531 A1 | 9/2022 | |
| WO | WO 2022/256306 A1 | 12/2022 | |

OTHER PUBLICATIONS

Authentication Method of Network Function in 5G Core System; Kr 20220006908 A; Jung Ji Young et al. (Year: 2022).*

Network Function Query Method And Device; CN 114039874 A; Li, Yun et al. (Year: 2022).*

Securely Identifying Network Function; WO 2021219385 A1; Bykampadi et al. (Year: 2021).*

Notification of Transmittal of the International Search Report and the Written Opinion of the International Searching Authority, or the Declaration for International Application No. PCT/US2022/031566 (dated Sep. 2, 2022).

Examiner-Initiated Interview Summary for U.S. Appl. No. 17/672,639 (dated Aug. 10, 2022).

Notice of Allowance and Fee(s) Due for U.S. Appl. No. 16/945,794 (dated Aug. 2, 2022).

Non-Final Office Action for U.S. Appl. No. 17/672,639 (dated Aug. 25, 2022).

Notice of Allowance for U.S. Appl. No. 17/200,777 (dated Jun. 30, 2022).

Final Office Action for U.S. Appl. No. 17/082,871 (dated Jun. 6, 2022).

(56) References Cited

OTHER PUBLICATIONS

Notice of Allowance for U.S. Appl. No. 17/009,725 (dated Jun. 13, 2022).
"3rd Generation Partnership Project; Technical Specification Group Core Network and Terminals; 5G System; Network Function Repository Services, Stage 3 (Release 16)," 3GPP TS 29.510, V16.6.0, pp. 1-227 (Jan. 2021).
Notification of Transmittal of the International Search Report and the Written Opinion of the International Searching Authority, or the Declaration for International Application No. PCT/US2022/019848 (dated Jun. 14, 2022).
Advisory Action and Examiner-Initiated Interview Summary for U.S. Appl. No. 16/945,794 (dated May 20, 2022).
Final Office Action for U.S. Appl. No. 16/945,794 (dated Feb. 8, 2022).
Non-Final Office Action for U.S. Appl. No. 17/082,871 (dated Feb. 7, 2022).
Non-Final Office Action for U.S. Appl. No. 17/543,989 (dated Mar. 28, 2023).
Notice of Allowance for U.S. Appl. No. 17/672,639 dated Mar. 20, 2023.
Examiner-Initiated Interview Summary for U.S. Appl. No. 17/397,968 (dated Mar. 21, 2023).
Examiner-Initiated Interview Summary for U.S. Appl. No. 17/672,639 (dated Mar. 7, 2023).
Non-Final Office Action for U.S. Appl. No. 17/337,356 (dated Jan. 17, 2023).
Examination Report for Patent Application No. IN202147036462 (dated Dec. 29, 2022) 1322/623PCT/IN.
Notice of Publication for U.S. Appl. No. 17/356,461 (dated Dec. 29, 2022).
Ex Parte Quayle Action for U.S. Appl. No. 17/672,639 (dated Dec. 23, 2022).
Notice of Publication for International Application Serial No. PCT/US2022/031566 (dated Dec. 8, 2022).
Non-Final Office Action for U.S. Appl. No. 17/397,968 (dated Dec. 9, 2022).
"3rd Generation Partnership Project; Technical Specification Group Core Network and Terminals; 5G System; Network Function Repository Services; Stage 3 (Release 17)," 3GPP TS 29.510, V17.4.0, pp. 1-284 (Dec. 2021).
Non-Final Office Action for U.S. Appl. No. 16/945,794 (dated Sep. 15, 2021).
Commonly-Assigned, co-pending U.S. Appl. No. 17/468,076 for "Methods, Systems, and Computer Readable Media for Using Service Communications Proxy (SCP) or Security Edge Protection Proxy (SEPP) to Apply or Override Preferred-Locality Attribute During Network Function (NF) Discovery" (Unpublished, filed Sep. 7, 2021).
Commonly-Assigned, co-pending U.S. Appl. No. 17/397,968 for "Methods, Systems, and Computer Readable Media for Processing Network Function (NF) Discovery Requests at NF Repository Function (NRF) Using Prioritized Lists of Preferred Locations," (Unpublished, filed Aug. 9, 2021).
Notification of Transmittal of the International Search Report and the Written Opinion of the International Searching Authority, or the Declaration for International Application No. PCT/US2021/024000 (dated Jun. 24, 2021).
Non-Final Office Action for U.S. Appl. No. 16/356,446 (dated Jun. 16, 2021).
Commonly-Assigned, co-pending U.S. Appl. No. 17/337,356 for "Methods, Systems, and Computer Readable Media for Applying or Overriding Preferred Locality Criteria in Processing Network Function (NF) Discovery Requests," (Unpublished, filed Jun. 2, 2021).
Notification of Transmittal of the International Search Report and the Written Opinion of the International Searching Authority, or the Declaration for U.S. Patent Application Serial No. PCT/US2021/020120 (dated Jun. 1, 2021).

"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).
"3rd Generation Partnership Project; Technical Specification Group Core Network and Terminals; 5G System; Technical Realization of Service Based Architecture; Stage 3 (Release 17)," 3GPP TS 29.500, V17.2.0, pp. 1-100 (Mar. 2021).
"3rd Generation Partnership Project; Technical Specification Group Services and System Aspects; Security architecture and procedures for 5G system (Release 17)," 3GPP TS 33.501, V17.1.0, pp. 1-256 (Mar. 2021).
"3rd Generation Partnership Project; Technical Specification Group Core Network and Terminals; 5G System; Public Land Mobile Network (PLMN) Interconnection; Stage 3 (Release 17)," 3GPP TS 29.573, V17.0.0, pp. 1-100 (Mar. 2021).
"3rd Generation Partnership Project; Technical Specification Group Services and System Aspects; System architecture for the 5G System (5GS); Stage 2 (Release 17)," 3GPP TS 23.501, V17.0.0, pp. 1-489 (Mar. 2021).
Commonly-Assigned, co-pending U.S. Appl. No. 17/203,693 for "Methods, Systems, and Computer Readable Media for Hypertext Transfer Protocol (HTTP) Stream Tuning for Load and Overload Control," (Unpublished, filed Mar. 16, 2021).
Commonly-Assigned, co-pending U.S. Appl. No. 17/200,777 for "Methods, Systems, and Computer Readable Media for Supporting Multiple Preferred Localities for Network Function (NF) Discovery and Selection Procedures" (Unpublished, filed Mar. 13, 2021).
Advisory Action for U.S. Appl. No. 16/356,446 (dated Dec. 22, 2020).
Commonly-Assigned, co-pending U.S. Appl. No. 17/082,871 for "Methods, Systems, and Computer Readable Media for Rank Processing for Network Function Selection," (Unpublished, filed Oct. 28, 2020).
Final Office Action for U.S. Appl. No. 16/356,446 (dated Sep. 8, 2020).
Commonly-Assigned, co-pending U.S. Appl. No. 17/009,725 for "Methods, Systems, and Computer Readable Media for Service Communications Proxy (SCP)-Specific Prioritized Network Function (NF) Discovery and Routing," (Unpublished, filed Sep. 1, 2020).
Commonly-Assigned, co-pending U.S. Appl. No. 16/945,794 for "Methods, Systems, And Computer Readable Media For Preferred Network Function (NF) Location Routing Using Service Communications Proxy (SCP)," (Unpublished, filed Jul. 31, 2020).
"3rd Generation Partnership Project; Technical Specification Group Core Network and Terminals; 5G System; Network Function Repository Services; Stage 3 (Release 16)," 3GPP TS 29.510 V16.4.0, pp. 1-206 (Jul. 2020).
"3rd Generation Partnership Project; Technical Specification Group Services and System Aspects; Procedures for the 5G System (5GS); Stage 2 (Release 16)," 3GPP TS 23.502 V16.4.0, pp. 1-582 (Mar. 2020).
"3rd Generation Partnership Project; Technical Specification Group Services and System Aspects; System architecture for the 5G System (5GS); Stage 2 (Release 16)," 3GPP TS 23.501 V16.4.0, pp. 1-430 (Mar. 2020).
Non-Final Office Action for U.S. Appl. No. 16/356,446 (dated May 11, 2020).
Nokia et al., "Discussion paper on authorization for Model D Indirect communications", 3GPP TSG SA WG3; S3-194380 (Nov. 11, 2019).
Commonly-Assigned, co-pending U.S. Appl. No. 16/356,446 for "Methods, Systems, And Computer Readable Media For Locality-Based Selection And Routing Of Traffic To Producer Network Functions (NFs)," (Unpublished, filed Mar. 18, 2019).
Fielding et al. "Hypertext Transfer Protocol (HTTP/1.1): Semantics and Content", Internet Engineering Taskforce (IETF) Request for Comments: 7231, IEFT RFC 7231, pp. 1-102 (Jun. 2014).
Notice of Allowance and Fee(s) Due for U.S. Appl. No. 17/082,871 (dated Sep. 28, 2022).
Commonly-Assigned, co-pending U.S. Appl. No. 17/672,639 for "Methods, Systems, and Computer Readable Media for Dynamic

(56) References Cited

OTHER PUBLICATIONS

Optimized Network Function Discovery for Consumer Network Functions" (Unpublished, filed Feb. 5, 2022).
Commonly-Assigned, co-pending U.S. Appl. No. 17/543,989 for "Methods, Systems, and Computer Readable Media for Dynamic Adjustment to Network Function Profile for Discovery Responses" (Unpublished, filed Dec. 17, 2021).
Commonly-Assigned, Co-pending U.S. Appl. No. 17/337,356 for "Methods, Systems, and Computer Readable Media for Applying or Overriding Preferred Locality Criteria in Processing Network Function (NF) Discovery Requests," (Unpublished, filed Jun. 6, 2021).
"3rd Generation Partnership Project; Technical Specification Group Services and System Aspects; Security architecture and procedures for 5G system (Release 17)," 3GPP TS 33.501, V17.3.0, pp. 1-258 (Sep. 2021).
"3rd Generation Partnership Project; Technical Specification Group Core Network and Terminals; 5G System; Network Function Repository Services; Stage 3 (Release 17)," 3GPP TS 29.510, V17.3.0, pp. 1-271 (Sep. 2021).
"3rd Generation Partnership Project; Technical Specification Group Services and System Aspects; System architecture for the 5G System (5GS); Stage 2 (Release 17)," 3GPP TS 23.501, V17.2.0, pp. 1-542 (Sep. 2021).
"3rd Generation Partnership Project; Technical Specification Group Core Network and Terminals; 5G System; Technical Realization of Service Based Architecture; Stage 3 (Release 17)," 3GPP TS 29.500, V17.4.0, pp. 1-109 (Sep. 2021).
Commonly-Assigned, co-pending U.S. Appl. No. 17/485,284 for Methods, Systems and Computer Readable Media For Providing Priority Resolver for Resolving Priorities and Network Function (NF) Instances (Unpublished, filed Sep. 24, 2021).
Notice of Allowance and Fee(s) Due for U.S. Appl. No. 16/356,446 (dated Sep. 30, 2021).
Notification of Transmittal of the International Search Report and the Written Opinion of the International Searching Authority, or the Declaration for International Application No. PCT/US2021/033031 (dated May 18, 2021).
"3rd Generation Partnership Project; Technical Specification Group Core Network and Terminals; Numbering, addressing and identification; (Release 17)," 3GPP TS 23.003, V17.1.0, pp. 1-143 (Mar. 2021).
"3rd Generation Partnership Project; Technical Specification Group Core Network and Terminals; 5G System; Session Management Services; Stage 3 (Release 17)," 3GPP 29.502, V17.1.0, pp. 1-299 (Jun. 2021).
"3rd Generation Partnership Project; Technical Specification Group Core Network and Terminals; 5G System; Principles and Guidelines for Services Definition; Stage 3 (Release 17)," 3GPP TS 29.501, V17.2.0, pp. 1-78 (Jun. 2021).
Vixie et al., "Dynamic Updates in the Domain Name System (DNS Update)," Network Working Group, RFC 2136, pp. 1-26 (Apr. 1997).
Examiner-Initiated Interview Summary for U.S. Appl. No. 17/337,356 dated May 2, 2023.
Non-Final Office Action for U.S. Appl. No. 17/468,076 (dated Apr. 28, 2023).
Final Office Action for U.S. Appl. No. 17/397,968 (dated Apr. 27, 2023).
Applicant-Initiated Interview Summary for U.S. Appl. No. 17/397,968 (dated Jul. 24, 2023).
Applicant-Initiated Interview Summary for U.S. Appl. No. 17/543,989 (dated Jul. 24, 2023).
Advisory Action for U.S. Appl. No. 17/397,968 (dated Jul. 14, 2023).
Final Office Action for U.S. Appl. No. 17/337,356 (dated Jun. 26, 2023).
Notice of Publication for European Patent Application Serial No. 21718460.5 (dated Jun. 14, 2023).
First Examination Report for Indian Patent Application Serial No. 202247065596 (dated May 30, 2023).
Notice of Publication for European Patent Application No. 21713526.8 (dated May 10, 2023).
Examiner-Initiated Interview Summary for U.S. Appl. No. 17/672,639 (dated Apr. 21, 2023).
Notice of Publication for European Patent Application Serial No. 21731870.8 (dated Aug. 9, 2023).
Non-Final Office Action for U.S. Appl. No. 17/397,968 (dated Aug. 23, 2023).
Applicant-Initiated Interview Summary for U.S. Appl. No. 17/468,076 (dated Sep. 22, 2023).
Notice of Allowance and Fee(s) Due for U.S. Appl. No. 17/337,356 (dated Sep. 14, 2023).
Notice of Allowance and Fee(s) Due for U.S. Appl. No. 17/543,989 (dated Sep. 13, 2023).

\* cited by examiner

400

| REQUESTER NF TYPE | TARGET NF TYPE | V-PLMN LOCALITY | H-PLMN LOCALITY |
|---|---|---|---|
| nftype2 | nftype1 | Location 1 | Location A |
| ALL | ALL | Location 2 | Location B |
| nftype2 | nftype1 | Location 3 | Location C |

FIG. 4

METHODS, SYSTEMS, AND COMPUTER READABLE MEDIA FOR NETWORK FUNCTION DISCOVERY USING PREFERRED-LOCALITY INFORMATION

TECHNICAL FIELD

The subject matter described herein relates to improving network function (NF) discovery in fifth generation (5G) and subsequent generation communications networks. More particularly, the subject matter described herein relates to methods, systems, and computer readable media for NF discovery using preferred-locality information in 5G and subsequent generation communications networks.

BACKGROUND

In telecommunications networks, a service endpoint is an address on a network node that uniquely identifies an entity that provides service to service consumers. The service endpoint can include an Internet protocol (IP) address or a combination of IP address and transport layer port number, which is also referred to as an IP endpoint.

In fifth generation (5G) telecommunications networks, the network node that provides service is referred to as a producer network function (NF). A network node that consumes services is referred to as a consumer NF. An NF can be both a producer NF and a consumer NF depending on whether it is consuming or providing service.

A given producer NF may have many service endpoints. Producer NFs register with an NF repository function (NRF). The NRF maintains NF profiles (e.g., data types or data structures for storing information about NF instances) of available NF instances and their supported services. Consumer NFs can subscribe to receive information about producer NF instances that have registered with the NRF.

In addition to consumer NFs, another type of network node that can subscribe to receive information about NF service instances is a service communications proxy (SCP). The SCP subscribes with the NRF and obtains reachability and service profile information regarding producer NF service instances. Consumer NFs connect to the service communications proxy, and the service communications proxy load balances traffic among producer NF service instances that provide the required service or directly routes the traffic to the destined producer NF.

In addition to the SCP, another example of an intermediate proxy node that routes traffic between producer and consumer NFs is the security edge protection proxy (SEPP). The SEPP is the network node used to protect control plane traffic that is exchanged between different 5G public land mobile networks (PLMNs). As such, the SEPP performs message filtering, policing and topology hiding for all application programming interface (API) messages that are transmitted between PLMNs.

One problem that may occur in 5G communications networks is that during NF discovery, a consumer NF may specify a preferred-locality IE (e.g., a parameter, an attribute, a field, etc.) in the NF discovery request that has no meaning to the NRF in the network of the NRF, or the consumer NF may not specify a preferred-locality IE in the NF discovery request. In either case, the NRF that receives the NF discovery request may utilize query parameters in the NF discovery request to generate a prioritized list of NF profiles of producer NFs that match the query parameters. In generating the prioritized list, the NRF uses the registered priority of each producer NF and the preferred-locality information, if present, to set the priorities of producer NF profiles returned to the consumer NF in the discovery response. For example, the NRF may prioritize producer NFs with localities that match the preferred-locality IE in the discovery request over producer NFs with localities that do not match the preferred-locality IE in the discovery request. If the preferred-locality IE is not present in the NF discovery request or if the preferred-locality IE has no meaning to the NRF because it specifies a locality in another network, the priorities in the list will be set based on the registered priorities of the producer NFs alone, which may result in producer NFs that are farther away from the consumer NF being assigned lower priorities (more preferred) than producer NFs that are closer to the consumer NF. As a result, when selecting a producer NF from the list to provide a service, the consumer NF may select a producer that is farther away from the consumer NF than another producer NF, resulting in increased latency in service communications.

In indirect communications without delegated discovery, NF discovery requests are routed to the NRF. In indirect communications with delegated discovery, the SCP receives a service based interface (SBI) request from a consumer NF and formulates and sends an NF discovery request to the NRF on behalf of the consumer NF. Like the direct communications cases mentioned in the preceding paragraph and indirect communications without delegated discovery, the NF discovery request may lack a preferred-locality IE or may include a preferred-locality IE that has no meaning in the network in which the NRF resides. Similarly, a SEPP may receive and forward inter-PLMN NF discovery requests that lack preferred-locality IEs or include preferred-locality IEs that have no meaning in the network of the NRF that processes the NF discovery request.

In light of these and other difficulties there exists a need for improved NF discovery procedures that increase the likelihood of resulting in an optimized set of NF profiles in an NF discovery response.

SUMMARY

Methods, systems, and computer readable media for network function (NF) discovery using preferred-locality information are disclosed. One example method for NF discovery using preferred-locality information comprises: at a first NF comprising at least one processor: receiving a message relating to a transaction involving a consumer NF; identifying, from the message, an NF instance identifier (ID) corresponding to the consumer NF; determining, using the NF instance ID and a data store including NF related information and corresponding preferred-locality information, a preferred-locality value; including the preferred-locality value in a preferred-locality information element (IE) of an NF discovery request; and transmitting the NF discovery request toward a second NF.

One example system for NF discovery using preferred-locality information includes at least one processor, a memory, and a first NF implemented using the at least one processor and the memory. The first NF is configured for: receiving a message relating to a transaction involving a consumer NF; identifying, from the message, an NF instance identifier (ID) corresponding to the consumer NF; determining, using the NF instance ID and a data store including NF related information and corresponding preferred-locality information, a preferred-locality value; including the pre-ferred-locality value in a preferred-locality information element (1E) of an NF discovery request; and transmitting the NF discovery request toward a second NF.

One example non-transitory computer readable medium comprising computer executable instructions embodied in the non-transitory computer readable medium that when executed by at least one processor of at least one computer cause the at least one computer to perform steps comprising: at a first NF comprising at least one processor: receiving a message relating to a transaction involving a consumer NF; identifying, from the message, an NF instance identifier (ID) corresponding to the consumer NF; determining, using the NF instance ID and a data store including NF related information and corresponding preferred-locality information, a preferred-locality value; including the preferred-locality value in a preferred-locality information element (IE) of an NF discovery request; and transmitting the NF discovery request toward a second NF.

In some embodiments, the preferred-locality value in a preferred-locality IE of an NF discovery request may be determined and included regardless of whether the NF discovery request already includes a preferred-locality IE. For example, a NF may override or replace an existing preferred-locality IE value (e.g., if the mapped or determined preferred-locality value) is different from the existing preferred-locality IE value.

In some embodiments, receiving the message relating to the transaction involving the consumer NF may include receiving a service based interface (SBI) request from the consumer NF. In such embodiments, it may be determined that the SBI request is lacking relevant (e.g., usable) preferred-locality information (e.g., a preferred-locality IE).

In some embodiments, identifying the NF instance ID corresponding to the consumer NF from an SBI request may include obtaining the NF instance ID from a User-Agent header of the SBI request. In such embodiments, in response to the SBI request, an NF discovery request may be generated by the first NF and may include appropriate preferred-locality information.

In some embodiments, receiving the message relating to the transaction involving the consumer NF may include receiving an NF discovery request from a consumer NF and determining that the NF discovery request may be lacking relevant preferred-locality information (e.g., a preferred-locality IE).

In some embodiments, identifying the NF instance ID corresponding to the consumer NF from an NF discovery request may include obtaining the NF instance ID from a User-Agent header of the NF discovery request. In such embodiments, the NF discovery request may be modified by the first NF to include appropriate preferred-locality information.

In some embodiments, determining the preferred-locality value (e.g., for an NF discovery request) using locality data (or a related data store) may include determining an NF type associating with a consumer NF using a NF instance ID corresponding to the consumer NF; determining an NF type associated with a target or requested producer NF (e.g., using a received SBI request or an NF discovery request); determining identify locality information indicating the locality of the consumer NF using the NF instance ID (e.g., by obtaining an NF profile from H-NRF 100 or from NF registration and/or topology information accessible by V-NRF 100); and then using the NF type associated with the consumer NF, the NF type associated with producer NF, and the locality of the consumer NF to identify a corresponding preferred-locality value.

In some embodiments, determining the preferred-locality value (e.g., for an NF discovery request) may include obtaining, using an NF instance ID, NF profile information associated with a consumer NF, wherein the NF profile information may include consumer NF locality information; and determining, using the consumer NF locality information and a data store including NF related information and corresponding preferred-locality information, the preferred-locality value.

In some embodiments, the NF related information and the corresponding preferred-locality information may be provided or provisioned by a network operator, e.g., prior to receiving an SBI request or an NF discovery request from a consumer NF.

In some embodiments, the first NF may include a visited network NF repository function (V-NRF) and the second NF may include a home network NF repository function (H-NRF).

In some embodiments, the first NF may include a visited network service communication proxy (V-SCP) or a V-NRF.

In some embodiments, the second NF includes a V-NRF or a H-NRF.

The subject matter described herein may be implemented in hardware, software, firmware, or any combination thereof. As such, the terms "function" "node" or "module" as used herein refer to hardware, which may also include software and/or firmware components, for implementing the feature being described. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 4 depicts example locality data usable for determining preferred-locality information;

DETAILED DESCRIPTION

The subject matter described herein relates to methods, systems, and computer readable media for network function (NF) discovery using preferred-locality information. In accordance with some aspects of the subject matter described herein, methods, systems, mechanisms, and/or techniques for performing message validation using stored authentication information obtained or derived from an user equipment (UE) authentication procedure (e.g., a 5G authentication and key agreement (AKA) procedure) are provided. For example, a security edge protection proxy (SEPP) in accordance with various aspects described herein can obtain or derive UE related authentication information (e.g., a UE identifier, a serving PLMN identifier, and UE authentication status) obtained by monitoring messages related to a 5G AKA procedure for authenticating a UE. In this example, the SEPP can avoid or mitigate security attacks and other issues by using the same authentication information for validating subsequent inter PLMN messages associated with the UE. Advantageously, by utilizing one or more techniques and/or methods described herein, a SEPP or another network node can prevent DOS attacks that use inter-PLMN traffic, prevent theft of subscriber data from a home network, and/or implement subscriber level authorization.

Reference will now be made in detail to various embodiments of the subject matter described herein, examples of which are illustrated in the accompanying drawings. Wherever possible, the same reference numbers will be used throughout the drawings to refer to the same or like parts.

Figure 1:
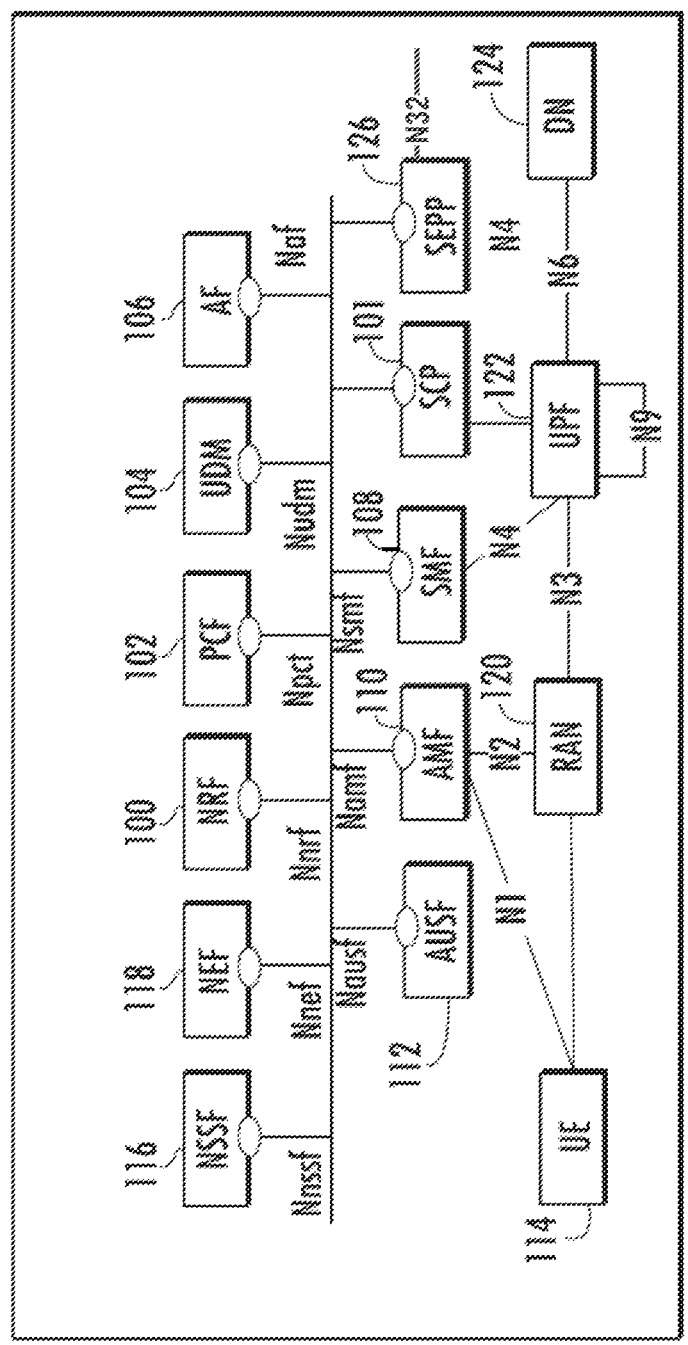
FIG. 1 is a network diagram illustrating an example fifth generation (5G) network architecture.

FIG. 1 is a block diagram illustrating an example 5G system network architecture, e.g., a home 5G core (5GC) network. The architecture in FIG. 1 includes an NRF 100 and an SCP 101, which may be located in the same home public land mobile network (PLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs. In addition, using the methodologies described herein, SCP 101 may perform preferred NF location based selection and routing.

NRF 100 is a repository for NF or service profiles of producer NF instances. In order to communicate with a producer NF instance, a consumer NF or an SCP must obtain the NF or service profile or the producer NF instance from NRF 100. The NF or service profile is a JavaScript object notation (JSON) data structure defined in Third Generation Partnership Project (3GPP) Technical Specification (TS) 29.510. The NF or service profile definition includes at least one of a fully qualified domain name (FQDN), an Internet protocol (IP) version 4 (IPv4) address, or an IP version 6 (IPv6) address. In FIG. 1, any of the nodes (other than NRF 100) can be either consumer NFs or producer NFs, depending on whether they are requesting or providing services. In the illustrated example, the nodes include a policy control function (PCF) 102 that performs policy related operations in a network, a user data management (UDM) function 104 that manages user data, and an application function (AF) 106 that provides application services. The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user devices, such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects UE 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

Security edge protection proxy (SEPP) 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

SEPP 126 may utilize an N32-c interface and an N32-f interface. An N32-c interface is a control plane interface between two SEPPs usable for performing an initial handshake (e.g., a TLS handshake) and negotiating various parameters for an N32-f interface connection and related message forwarding. An N32-f interface is a forwarding interface between two SEPPs usable for forwarding various communications (e.g., 5GC requests) between a consumer NF and a producer NF after applying application level security protection.

As stated above, one problem in 5G networks is that during NF discovery, a consumer NF either doesn't specify a preferred-locality attribute or specifies a preferred-locality attribute that has no meaning in the network of the receiving NRF 100. As a result, sub-optimal producer NF selection can occur. During registration with NRF 100, each producer NF can specify its locality as a registration attribute or parameter, which is stored by NRF 100 in a data structure referred to as an NF profile or NF profile object. The registration process is conducted according to 3GPP TS 29.510 where each NF sends an NF register message to NRF 100. The NF register message includes the NF profile of each NF. Table 6.1.6.2.2-1 of 3GPP TS 29.510 defines the attributes that may be included in an NF profile. Of interest to the subject matter described herein is the locality attribute of the NF profile. Table 1 shown below is an excerpt from Table 6.1.6.2.2-1 of 3GPP TS 29.510 illustrating the locality attribute.

TABLE 1

Locality Attribute of NF Profile

| Attribute name | Data type | P | Cardinality | Description |
|---|---|---|---|---|
| Locality | string | O | 0 . . . 1 | Operator defined information about the location of the NF instance (e.g., geographic location, data centre) (NOTE 3) |

NOTE 3:
A requester NF may use this information to select an NF instance (e.g., an NF instance preferably located in the same data center).

As indicated by Table 1, the locality attribute may store operator-defined information about the location of an NF instance, such as geographic location and data center. According to Note 3 of Table 1, the locality attribute can be used during NF discovery to select a producer NF that is in the same data center as the requesting consumer NF. However, the consumer NF may not know the correct locality attribute to specify in a discovery request, which can result in sub-optimal NF selection.

The preferred-locality is an optional attribute that may be included in an NF discovery request. Table 2 shown below is an excerpt from Table 6.2.3.2.3.1-1 of 3GPP TS 29.510 and indicates how the NRF processes the preferred-locality attribute in an NF discovery request.

TABLE 2

NRF Processing of Preferred-Locality Attribute

| Attribute Name | Data Type | P | Cardinality | Description | Applic- ability |
|---|---|---|---|---|---|
| Preferred- locality | String | O | 0 . . . 1 | Preferred target NF location (e.g., geographic location, data center). When present, the NRF shall prefer NF profiles with a locality attribute that matches the preferred- locality. The NRF may return additional NFs in the response not matching the preferred target NF location, e.g., if no NF profile is found matching the pre- ferred target NF location. The NRF should set a lower priority for any additional NFs on the response not matching the preferred target NF location than those matching the preferred target | |

TABLE 2-continued

NRF Processing of Preferred-Locality Attribute

| Attribute Name | Data Type | P | Cardinality | Description | Applic- ability |
|---|---|---|---|---|---|
| | | | | NF location. (NOTE 6) | |

As indicated in Table 2, when the preferred-locality attribute is present, NRF 100 may prefer NF profiles with a locality attribute that matches the preferred-locality attribute in an NF discovery request. NRF 100 may also return additional NF profiles in the discovery response not matching the preferred-locality, for example, if no NF profile is found matching the preferred-locality. NRF 100 may also set a lower priority for additional NF profiles in the discovery response that do not match the preferred-locality.

Thus, preferred-locality is an optional attribute sent by consumer NFs during discovery that, when present, may be configured by the network operator to indicate a preferred location of a producer NF that would serve the consumer NF. Typically, the preferred-locality of a consumer NF may be the locality of the consumer NF or the locality of a preferred producer NF. NRF 100 may set a less-preferred (higher in number according to the 3GPP-defined priority numbering scheme where lower priority numbers indicate more preferred priorities) priority for any additional NFs in a discovery response with a registered locality parameter that does not match the preferred-locality identified in an NF discovery request. NF profiles that match the discovery request's search criteria may be ordered or prioritized as follows: preferred-locality and registered priority.

It will be appreciated that FIG. 1 is for illustrative purposes and that various nodes and/or modules, locations, and/or functionality described above in relation to FIG. 1 may be changed, altered, added, or removed.

Figure 2:
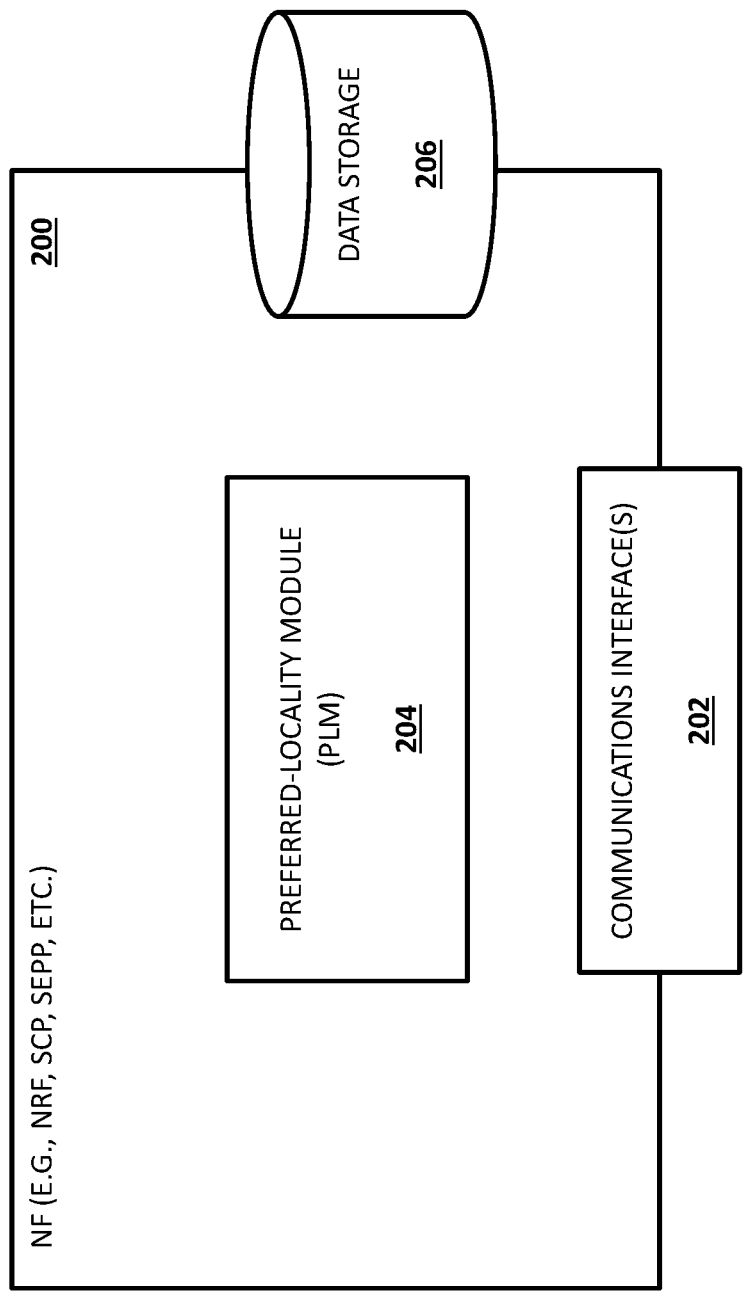
FIG. 2 is a block diagram illustrating an example network function (NF) for determining preferred-locality information for an NF discovery request.

FIG. 2 is a diagram illustrating an example NF 200 an example network node for determining preferred-locality information for NF discovery requests. NF 200 may represent any suitable entity or entities (e.g., one or more node(s), device(s), or computing platform(s)) for performing various aspects associated with determining preferred-validity information for an NF discovery request, e.g., using preconfigured associations between NF instance IDs or related NF types (e.g., related to a consumer NF or a requester) and preferred-locality information. In some embodiments, NF 200 may represent or include one or more 5GC NFs, e.g., an NRF, a SEPP, a SCP, etc. For example, NF 200 may represent or include an authorization server, a data repository, a network gateway, a network proxy, an edge security device, or other functionality.

In some embodiments, NF 200 or a related module (e.g., a locality module) may be configured (e.g., via programming logic) to determine appropriate preferred-locality information for NF discovery requests (e.g., inter-PLMN 5G NF discovery requests) and to insert or include the preferred-locality information in the NF discovery requests. For example, NF 200 may access locality identifying information (e.g., predefined and provided by a network operator) that maps consumer NF information (e.g., NF instance IDs) and preferred-locality values. In this example, using an NF instance ID associated with a consumer NF (e.g., obtained from a User-Agent header portion of an NF discovery request or an SBI request), NF 200 or a related entity may determine a corresponding preferred-locality IE (e.g., attribute or related value) from the locality identifying information and may include the preferred-locality IE in an NF discovery request.

Referring to FIG. 2, NF 200 may include one or more communications interface(s) 202 for communicating messages via a communications environment, e.g., one or more 5G networks. For example, communications interface(s) 202 may include one or more communication interfaces for communicating with various entities in a home network (e.g., home public land mobile network (H-PLMN)) or a visited network (e.g., a visited public land mobile network (V-PLMN)).

NF 200 may include a preferred-locality module (PLM) 204. PLM 204 may be any suitable entity (e.g., software executing on at least one processor) for performing one or more aspects associated with determining and/or using preferred-locality information. In some embodiments, PLM 204 may be configured for receiving a request related to NF discovery (e.g., an inter-PLMN 5G NF discovery request or an SBI request with 3gpp-Sbi-Discovery headers); determining that the request is lacking relevant preferred-locality information; determining, using an NF instance ID associated with consumer NF 304 and a data store indicating associations between localities of various PLMNs, a preferred-locality value (e.g., a data string or identifier); including the preferred-locality value in a preferred-locality IE (e.g., a parameter, an attribute, a field, etc.) of the NF discovery request; and transmitting the NF discovery request toward H-NRF 100 or another node.

In some embodiments, PLM 204 may be configured for accessing or utilizing a data store indicating associations between localities of various PLMNs, e.g., localities in a visited network (e.g., V-PLMN) mapped to localities in a home network (e.g., a H-PLMN). For example, PLM 204 may use an NF instance ID obtained from a received request to obtain a consumer NF's locality (e.g., by querying V-NRF 100) and then use the consumer NF's locality (e.g., a V-PLMN locality) to identify a corresponding preferred-locality (e.g., a H-PLMN locality). In some embodiments, e.g., where NF 200 includes SCP 101 or related functionality, NF 200 or PLM 204 therein may be configured for receiving a request related to NF discovery (e.g., an inter-PLMN 5G NF discovery request or an SBI request with 3gpp-Sbi-Discovery headers); determining that the request is lacking relevant preferred-locality information; determining, using an NF instance ID associated with consumer NF 304 and a data store indicating associations between localities of various PLMNs, a preferred-locality value (e.g., a data string or identifier); including the preferred-locality value in a preferred-locality IE (e.g., a parameter, an attribute, a field, etc.) of an NF discovery request; and transmitting the NF discovery request toward H-NRF 100, e.g., via SEPPs 126 and H-SCP 101.

In some embodiments, e.g., where NF 200 includes V-NRF 100 or related functionality, NF 200 or PLM 204 therein may be configured for receiving an NF discovery request; determining that the NF discovery request is lacking relevant preferred-locality information; determining, using an NF instance ID associated with consumer NF 304 and a data store indicating associations between localities of various PLMNs, a preferred-locality value (e.g., a data string or identifier); including the preferred-locality value in a preferred-locality IE (e.g., a parameter, an attribute, a field, etc.) of the NF discovery request; and transmitting the NF discovery request toward H-NRF 100, e.g., via SEPPs 126.

In some embodiments, e.g., where NF 200 includes H-SEPP 126 or related functionality, NF 200 or PLM 204 therein may be configured for receiving an NF discovery request; determining that the NF discovery request is lacking relevant preferred-locality information; determining, using an NF instance ID associated with consumer NF 304 and a data store indicating associations between localities of various PLMNs, a preferred-locality value (e.g., a data string or identifier); including the preferred-locality value in a preferred-locality IE (e.g., a parameter, an attribute, a field, etc.) of the NF discovery request; and transmitting the NF discovery request toward H-NRF 100.

In some embodiments, e.g., to determine or identify appropriate preferred-locality information for an NF discovery request, NF 200 or PLM 204 therein may be configured for obtaining or extracting an NF instance ID of consumer NF 304 from a User-Agent header portion of a received NF discovery request or an SBI request. For example, after receiving a request related to NF discovery and determining that the request lacked preferred-locality information, NF 200 or PLM 204 therein may extract an NF instance ID from a User-Agent header of the received request and use the NF instance ID to determine a corresponding preferred-locality from a data store indicating NF instance IDs (or related data) and corresponding preferred-locality values.

The User-Agent header is a standard header that may be used in HTTP requests supported on SBI. Table 3 shown below is an excerpt from Table 5.2.2.2-1 of 3GPP TS 29.500 and indicates that the User-Agent header shall be mainly used to identify the NF type of the HTTP/2 client.

TABLE 3

User-Agent Header Information

| Name | Reference | Description |
| --- | --- | --- |
| User-Agent | IETF RFC 7231 | This header shall be mainly used to identify the NF type of the HTTP/2 client. This header should be included in every HTTP/2 request sent over any SBI.<br>For indirect communications, the User-Agent header in a request that is:<br>forwarded by the SCP (with or without delegated discovery) shall identify the NF type of the original NF that issued the request (i.e., the SCP shall forward the header received in the incoming request);<br>originated by the SCP towards the NRF (e.g., NF Discovery or Access Token Request) shall identify the SCP.<br>The pattern of the content should start with the value of NF type (e.g., udm, see NOTE 1) or "SCP" (for a request originated by an SCP) and followed by a "-" any other specific information if needed afterwards. |

NOTE 1:
The value of NF type in the User-Agent header shall comply with the enumeration value of Table 6.1.6.3.3-1 in 3GPP TS 29.510.

NF 200 may access (e.g., read from and/or write information to) data storage 206. Data storage 206 may be any suitable entity (e.g., a computer readable medium or memory) for storing various data. In some embodiments, data storage 206 may include locality mapping information usable for identifying appropriate preferred-locality information for NF discovery request. For example, data store 206 may include data records or entries indicating associations between V-PLMN localities (e.g., where V-PLMN is serving a consumer NF) and H-PLMN localities (e.g., where producer NFs are being requested). In some embodiments, data storage 206 may include logic for performing various aspects of NF discovery, e.g., such as generating and/or modifying NF discovery requests to include preferred-locality information.

It will be appreciated that FIG. 2 and its related description are for illustrative purposes and that NF 200 may include additional and/or different modules, components, or functionality.

Figure 3:
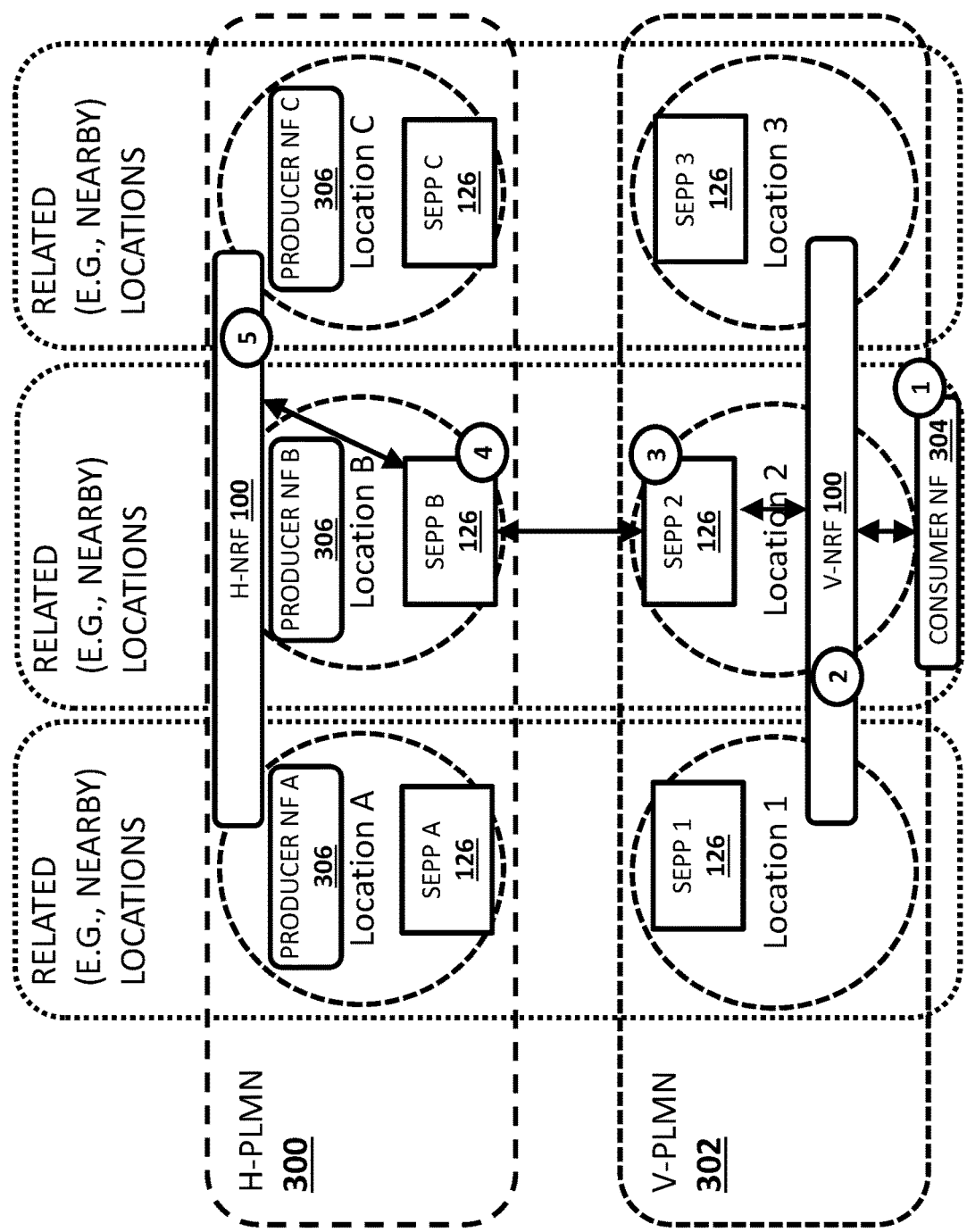
FIG. 3 is a network diagram illustrating an example NF discovery procedure involving a home public land mobile network (H-PLMN) and a visited PLMN (V-PLMN)

FIG. 3 is a network diagram illustrating an example NF discovery procedure involving a home public land mobile network (H-PLMN) 300 and a visited PLMN (V-PLMN) 302. H-PLMN 300 may represent a network (e.g., a network comprising 5GC network) and may be the home network of a consumer NF 304. V-PLMN 302 may represent another network (e.g., a network comprising another operator's 5GC network) and may be the network currently serving consumer NF 304. Each of H-PLMN 300 and V-PLMN 302 may include various NFs, where at least some NFs are located in one or more geographical locations (e.g., localities). For example, as depicted in FIG. 3, H-PLMN 300 may include three locations: location 'A', location 'B', and location 'C'; and V-PLMN 302 may also include three locations: location '1', location '2', and location '3'.

In some embodiments, network operators associated with H-PLMN 300 and V-PLMN 302 may have a service-level agreement (SLA) for allowing and governing inter-PLMN communications. For example, SEPPs 126 may be deployed at the boundaries of each location within a respective network for supporting inter-PLMN service requests. In this example, SEPP 126 for a given location in a given network may be configured with addresses for communicating with remote SEPPs 126 of another network (e.g., as a primary, a secondary, etc.) and this configuration of remote SEPP addresses may be based on the location of the remote SEPPs 126, e.g., the nearest remote SEPP 126 to a local SEPP 126 may be configured as its primary remote SEPP 126.

In some embodiments, each of H-PLMN 300 and V-PLMN 302 may deployed NRFs 100 at a network level or a locality level. For example, as depicted in FIG. 3, each of H-PLMN 300 and V-PLMN 302 may deploy NRF 100 at a network level, e.g., NRF 100 may handle requests for multiple localities. In another example, each of H-PLMN 300 and V-PLMN 302 may deploy one or more NRFs 100 for each locality. In this example, each NRF 100 may be configured with addresses for communicating with remote NRFs 100 of another network (e.g., as a primary, a secondary, etc.) and this configuration of remote NRF addresses may be based on the location of the remote NRFs 100, e.g., the nearest remote NRF 100 to a local NRF 100 may be configured as its primary remote NRF 100.

In some embodiments, an inter-PLMN service request from consumer NF 304 (e.g., AMF 110) in a particular location or locality of V-PLMN 302 to one of producer NFs 306 in a particular location or locality of H-PLMN 300 may involve the inter-PLMN service request traversing, in order, consumer NF 304, a local V-SEPP (e.g., SEPP 2 126), a remote SEPP (e.g., SEPP B 126), a selected producer NF (e.g., producer NF C 306).

Referring to FIG. 3, an example inter-PLMN NF discovery procedure may involve an inter-PLMN NF discovery request traversing NFs in V-PLMN 302 and H-PLMN 300. In step 1, consumer NF 304 in location '2' of V-PLMN 302 may generate and send an inter-PLMN NF discovery request to V-NRF 100 and destined for H-NRF 100 in H-PLMN 300. Preferred locality information may not be inserted in the NF discovery request because consumer NF 304 may be unaware of a target producer's locality information of H-PLMN 300.

In step 2, since it is an inter-PLMN request, V-NRF 100 may forward the NF discovery request to local SEPP 2 216.

In step 3, SEPP 2 216 may forward the NF discovery request to primary SEPP B 126 in location 'B' of H-PLMN 300.

In step 4, SEPP 2 216 may forward the NF discovery request V-NRF 100.

In step 5, H-NRF 100 may receive an NF discovery request and select a number of NF profiles indicating producer NFs 306 for providing the service or information, e.g., based on various attributes or parameters in the NF discovery request. Due to the lack or absence of preferred-locality information in the NF discovery request, H-NRF 100 cannot prioritize the producer NFs matching the given criteria based on preferred-locality when generating a response to the inter-PLMN discovery request.

In some embodiments, while both H-PLMN 300 and V-PLMN 302 may include multiple localities, network operators may not share locality attributes across PLMN boundaries. As a result, an NF discovery request associated with consumer NF 304 may not include a preferred-locality attribute that matches a locality in H-PLMN 300. In the absence of a preferred-locality attribute in an NF discovery request, the list of NF profiles of producer NFs 306 returned in a corresponding NF discovery response may prefer or prioritize producer NFs 306 located farther from consumer NF 306 than other producer NFs that are less preferred (higher priority) in the list. Hence, if NF profiles are not prioritized based on preferred-locality, then consumer NF 304 will most likely select a less than optimal producer NF 306 (e.g., producer NF C 306) in the NF discovery response to process a service request, which can result in an unnecessarily costly communication path for consumer NF 304, because producer producer NF C 306 is farther from consumer NF 304 than producer NF B 306. This NF selection may therefore be inefficient with respect to latency, throughput and resource utilization between consumer NF and selected producer NF if both are located geographically apart.

It will be appreciated that FIG. 3 and its related description are for illustrative purposes and H-PLMN 300 and/or V-PLMN 302 may include additional and/or different modules, components, or functionality.

FIG. 4 depicts example locality data 400 usable for determining preferred-locality information. Locality data 400 may represent information for mapping localities of various PLMNs, e.g., V-PLMN 302 and H-PLMN 300. For example, locality data 400 may be stored in a data structure (e.g., a data store) in data storage 206 or another storage device at one or more NFs (e.g., V-NRF 100 or V-SCP 101).

Referring to FIG. 4, locality data 400 may be depicted as a data table containing multiple columns, where each row represents an association or mapping between requester NF information, target NF information, a requester's locality information, and a corresponding target locality (e.g., preferred-locality value or information).

As depicted in FIG. 4, a "Requester NF Type" column may indicate the type of NF or other NF information (e.g., an NF instance ID) associated with a requesting NF (e.g., consumer NF 304). Example data in the "Requester NF Type" column may indicate a particular type or types of requesting NFs, (e.g., AMF, SMF, NEF, etc.) or may indicate any or all types, e.g., "ALL".

A "Target NF Type" column may indicate the type of NF or other NF information associated with a requested or target NF (e.g., producer NF(s) 306). Example data in the "Target NF Type" column may indicate a particular type or types of requesting NFs, (e.g., AMF, SMF, NEF, etc.) or may indicate any or all types, e.g., "ALL".

A "V-PLMN Locality" column may indicate a current locality of V-PLMN 302 serving a requesting NF (e.g., consumer NF 304). Example data in the "V-PLMN Locality" column may indicate a word, a value, or other identifier for representing or indicating a locality of V-PLMN 302.

A "H-PLMN Locality" column may indicate a preferred locality in H-PLMN 300 for a requested or target NF (e.g., producer NF(s) 306). Example data in the "H-PLMN Locality" column may indicate a word, a value, or other identifier for representing or indicating a locality of H-PLMN 300.

In some embodiments, locality data 400 may be stored in one or more data structures. For example, mappings between localities in a given PLMN and localities in V-PLMN 302 may be stored separately from mappings between localities in H-PLMN 300 and localities in V-PLMN 302. In another example, mappings between localities in V-PLMN 302 and localities in multiple PLMNs may be stored together in a single data structure for efficiency or other reasons.

In some embodiments, locality data 400 can be used to lookup appropriate preferred-locality information for inter-PLMN NF discovery requests from consumer NF 304. For example, NF 200 or PLM 204 therein may obtain an NF instance ID from a User-Agent header portion of an NF discovery request or SBI request and then obtain consumer NF locality information (e.g., a location name or identifier) from NF profile registration data (e.g., by querying V-NRF 100 using the NF instance ID). In this example, using the consumer NF locality information (and potentially the NF type or NF instance ID), NF 200 or PLM 204 therein may determine a corresponding target H-PLMN locality (e.g., a preferred-locality value) from locality data 400.

In some embodiments, an NF type for a given NF or NF instance may de derived from or indicating by a related NF instance ID. For example, an NF instance ID "SCP-4335563" may include a first portion (e.g., the text portion before the dash) that adequately identifies the NF type of the NF instance (e.g., "SCP").

In some embodiments, preferred-locality information (e.g., H-PLMN Locality data) may be indexed or otherwise determinable using one or more factors. For example, preferred-locality information (e.g., H-PLMN Locality data) fora given NF discovery request may be determined using the NF Type of the NF discovery requester (e.g., consumer NF 304), the NF type of the requested or target NF (e.g., producer NF 306), and the requester's locality information (e.g., the V-PLMN locality associated with consumer NF 304). In another example, e.g., where an association indicates that the mapping applies for all NF types, preferred-locality information (e.g., H-PLMN Locality data) for a given NF discovery request may be determined based on a requester's locality information (e.g., the V-PLMN locality associated with consumer NF 304).

In some embodiments, a network operator may provision or provide locality data 400 or portion(s) thereof at various times, e.g., an initialization time, dynamically (e.g., when SLAs are modified or renewed, based on network conditions, etc.), and/or periodically (e.g., daily, every 3 hours, etc.). For example, when an SLA is entered between two PLMNs, a network operator may provide or indicate associations between localities of a visited network (e.g., V-PLMN 300) and localities in the operator's network (e.g., H-PLMN 302). In this example, each mapping or association may indicate that a locality of H-PLMN 300 and a locality of V-PLMN 302 are geographically near (e.g., the same city or data center), such that inter-PLMN communications involving these associated localities may reduce latency, increase throughput, and/or reduce resource utilization.

It will be appreciated that locality data 400 is for illustrative purposes and that different and/or additional data than the data depicted in FIG. 4 may be usable for determining preferred-locality information for an NF discovery request.

Figure 5:
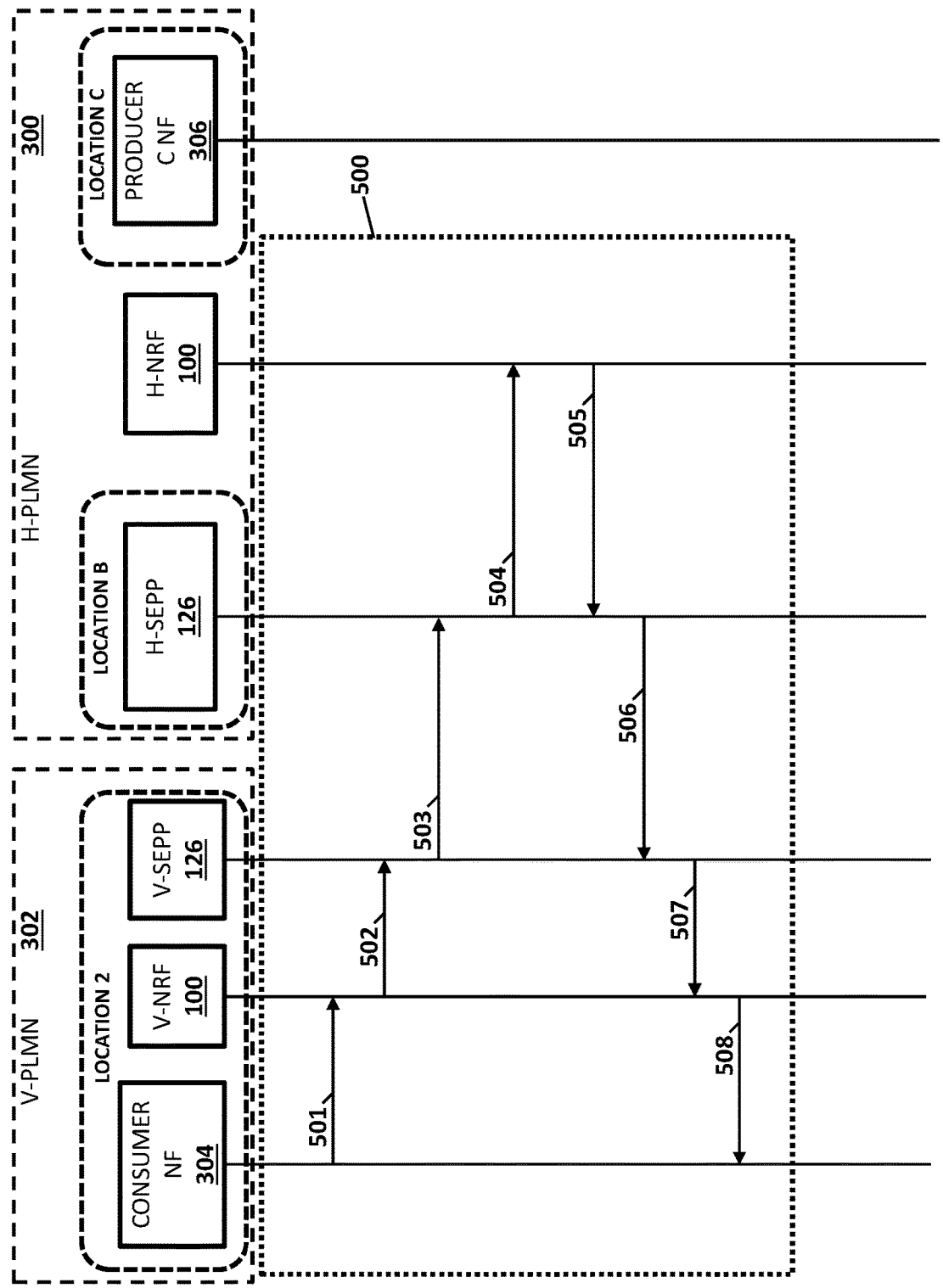
FIG. 5 is a message flow diagram illustrating an NF discovery procedure without using preferred-locality information.

FIG. 5 is a message flow diagram illustrating an NF discovery procedure 500 without using preferred-locality information. In some embodiments, H-NRF 100 (without PLM 204) may receive an NF discovery request requesting one or more NFs for providing a particular service or information and may provide an NF discovery response comprising NF profiles or other information (e.g., NF instance IDs) for identifying relevant NF instances.

Referring to FIG. 5, in step 501, an NF discovery request (e.g., an inter-PLMN NF discovery request) may be sent from consumer NF 304 in location '2' of V-PLMN 302 to V-NRF 100 in V-PLMN 302 for requesting NF instance(s) that can provide a particular service or related information from H-PLMN 300. The NF discovery request may lack a preferred-locality information element (IE) (e.g., a preferred-locality attribute or parameter). For example, consumer NF 304 may not insert preferred-locality information into an NF discovery request because consumer NF 304 may be unaware of relevant locality information of H-PLMN 300.

In step 502, the NF discovery request may be sent from V-NRF 100 to V-SEPP 126 for forwarding to H-NRF 100 in H-PLMN 300.

In step 503, the NF discovery request (e.g., as an HTTP/2 message) may be forwarded from V-SEPP 126 to H-SEPP 126 (e.g., a primary SEPP of H-PLMN 300 in location 'B') via an N32-f interface.

In step 504, the NF discovery request may be sent from H-SEPP 126 to H-NRF 100. For example, H-NRF 100 may receive an NF discovery request and select a number of NF profiles indicating producer NFs 306 for providing the service or information, e.g., based on various attributes or parameters in the NF discovery request.

In some embodiments, when an NF discovery request lacks preferred-locality information, H-NRF 100 may generate a list indicating producer NFs 306 that are un-prioritized relative to preferred-locality information.

In step 505, an NF discovery response comprising or indicating an unprioritized list indicating various producer NFs may be generated and sent from H-NRF 100 to H-SEPP 126 for forwarding to V-PLMN 302.

In step 506, the NF discovery response (e.g., as an HTTP/2 message) may be forwarded from H-SEPP 126 to V-SEPP 126 via an N32-f interface.

In step 507, the NF discovery response may be sent from V-SEPP 126 to V-NRF 100.

In step 508, the NF discovery response may be sent from V-NRF 100 to consumer NF 304.

In some embodiments, consumer NF 304 may select one of the producer NFs 306 indicated by the NF discovery response and may use a corresponding NF instance ID to request service or related data from producer C NF 306 in location 'C', e.g., via an SBI request. In such embodiments, usage of selected producer C NF 306 may yield inefficiencies (e.g., with respect to latency, throughput, and resource utilization) for communications between consumer NF 304 and selected producer NF 306 if both are located geographically apart (e.g., in different cities or states) and/or communicatively apart (e.g., slow or burdensome connectivity between the two NFs).

It will be appreciated that FIG. 5 is for illustrative purposes and that different and/or additional messages and/or actions may be used. It will also be appreciated that various messages and/or actions described herein may occur in a different order or sequence.

Figure 6:
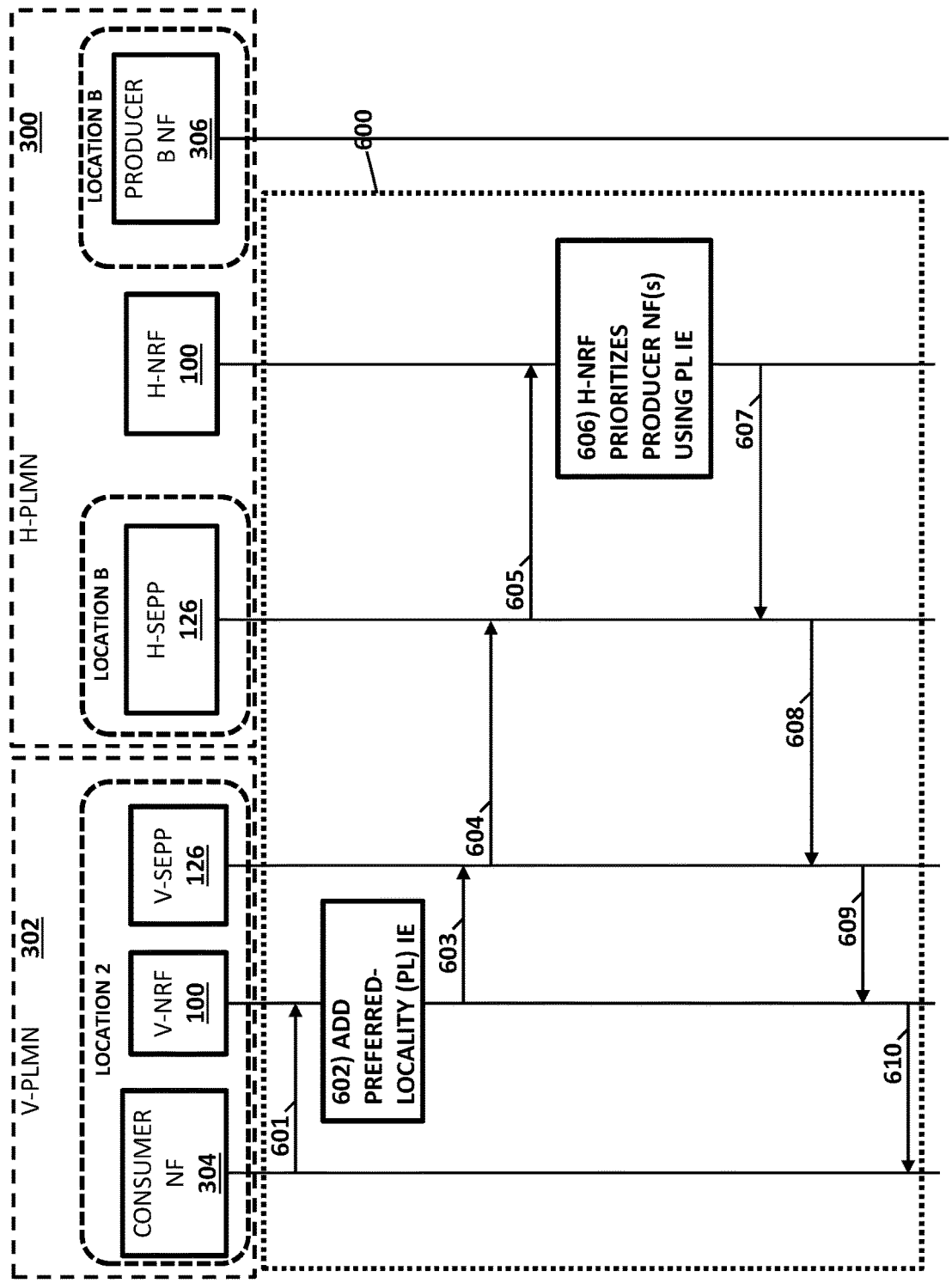
FIG. 6 is a message flow diagram illustrating an NF discovery procedure using preferred-locality information provided by a visited network NF repository function (V-NRF)

FIG. 6 is a message flow diagram illustrating an NF discovery procedure 600 using preferred-locality information provided by V-NRF 100. In some embodiments, V-NRF 100 may include PLM 204 and may be capable of including or inserting preferred-locality information in NF discovery requests. In such embodiments, V-NRF 100 and/or PLM 204 may be configured for receiving an NF discovery request associated with consumer NF 304; determining that the NF discovery request is lacking relevant preferred-locality information; determining, using an NF instance ID associated with consumer NF 304 and locality data 400, a preferred-locality value (e.g., a data string or identifier); including the preferred-locality value in a preferred-locality IE (e.g., a parameter, an attribute, a field, etc.) of the NF discovery request; and transmitting the NF discovery request toward H-NRF 100, e.g., via SEPPs 126.

Referring to FIG. 6, in step 601, an NF discovery request (e.g., an inter-PLMN NF discovery request) may be sent from consumer NF 304 in location '2' of V-PLMN 302 to V-NRF 100 in V-PLMN 302 for requesting NF instance(s) that can provide a particular service or related information from H-PLMN 300. The NF discovery request may lack a preferred-locality IE (e.g., a preferred-locality attribute or parameter) or may include a preferred-locality IE. For example, consumer NF 304 may not insert preferred-locality information into an NF discovery request because consumer NF 304 may be unaware of relevant locality information of H-PLMN 300. In another example, consumer NF 304 may insert preferred-locality information into an NF discovery request that is irrelevant because consumer NF 304 may be unaware of relevant locality information of H-PLMN 300.

In step 602, V-NRF 100 may use an NF instance ID or an NF type associated with consumer NF 304 to identify a preferred-locality value from locality data 400 or a related data store and may include or insert the preferred-locality value in the NF discovery request or a version thereof.

In some embodiments, V-NRF 100 may override or replace an existing preferred-locality IE value (e.g., if the mapped or determined preferred-locality value) is different from the existing preferred-locality IE value.

In some embodiments, e.g., to determine or identify appropriate preferred-locality information for a given NF discovery request, V-NRF 100 may determine that a preferred-locality IE of a received NF discovery request is missing or irrelevant and, after determining that the preferred-locality IE is missing or irrelevant, V-NRF 100 may obtain or extract an NF instance ID of consumer NF 304 from a User-Agent header portion of the NF discovery request. V-NRF 100 may then identify locality information indicating the locality of consumer NF 304 using the NF instance ID (e.g., by obtaining an NF profile from H-NRF 100 or from NF registration and/or topology information accessible by V-NRF 100). Using the consumer NF locality information (e.g., a location name or identifier), V-NRF 100 may determine corresponding target PLMN preferred-locality information (e.g., a preferred-locality value) from a preconfigured data store indicating associations between consumer NF locality information and producer NF preferred-locality information.

In step 603, the modified NF discovery request with the preferred-locality information may be sent from V-NRF 100 to V-SEPP 126 for forwarding to H-NRF 100 in H-PLMN 300.

In step 604, the modified NF discovery request (e.g., as an HTTP/2 message) may be forwarded from V-SEPP 126 to H-SEPP 126 (e.g., a primary SEPP of H-PLMN 300 in location 'B') via an N32-f interface.

In step 605, the modified NF discovery request may be sent from H-SEPP 126 to H-NRF 100.

In step 606, H-NRF 100 may receive the modified NF discovery request and may use the preferred-validity value in the NF discovery request to identify and prioritize a list indicating various producer NFs (e.g., indicating producer B NF 306 in location 'B' as the top choice) for providing the requested service or information. For example, a group of producer NFs 306 in a given NF discovery response may be sorted or prioritized based on preferred-locality information such that the order is based on how geographically close producer NFs 306 are to the preferred-locality value in the NF discovery request.

In step 607, an NF discovery response comprising or indicating a prioritized list indicating various producer NFs may be generated and sent from H-NRF 100 to H-SEPP 126 for forwarding to V-PLMN 302.

In step 608, the NF discovery response (e.g., as an HTTP/2 message) may be forwarded from H-SEPP 126 to V-SEPP 126 via an N32-f interface.

In step 609, the NF discovery response may be sent from V-SEPP 126 to V-NRF 100.

In step 610, the NF discovery response may be sent from V-NRF 100 to consumer NF 304.

In some embodiments, consumer NF 304 may select the first NF (e.g., producer NF 306 with the highest priority) in the prioritized list indicating various producer NFs 306 and may use a corresponding NF instance ID to request service or related data from that producer B NF 306 in location 'B', e.g., via an SBI request. In such embodiments, where consumer NF 304 and selected producer NF 306 are geographically or communicatively close (e.g., in the same city, at the same serving node, at the same data center, etc.), usage of selected producer B NF 306 may be more efficiently with respect to latency, throughput, and resource utilization than other producer NFs that are geographically and/or communicatively apart from consumer NF 304.

It will be appreciated that FIG. 6 is for illustrative purposes and that different and/or additional messages and/or actions may be used. It will also be appreciated that various messages and/or actions described herein may occur in a different order or sequence.

Figure 7:
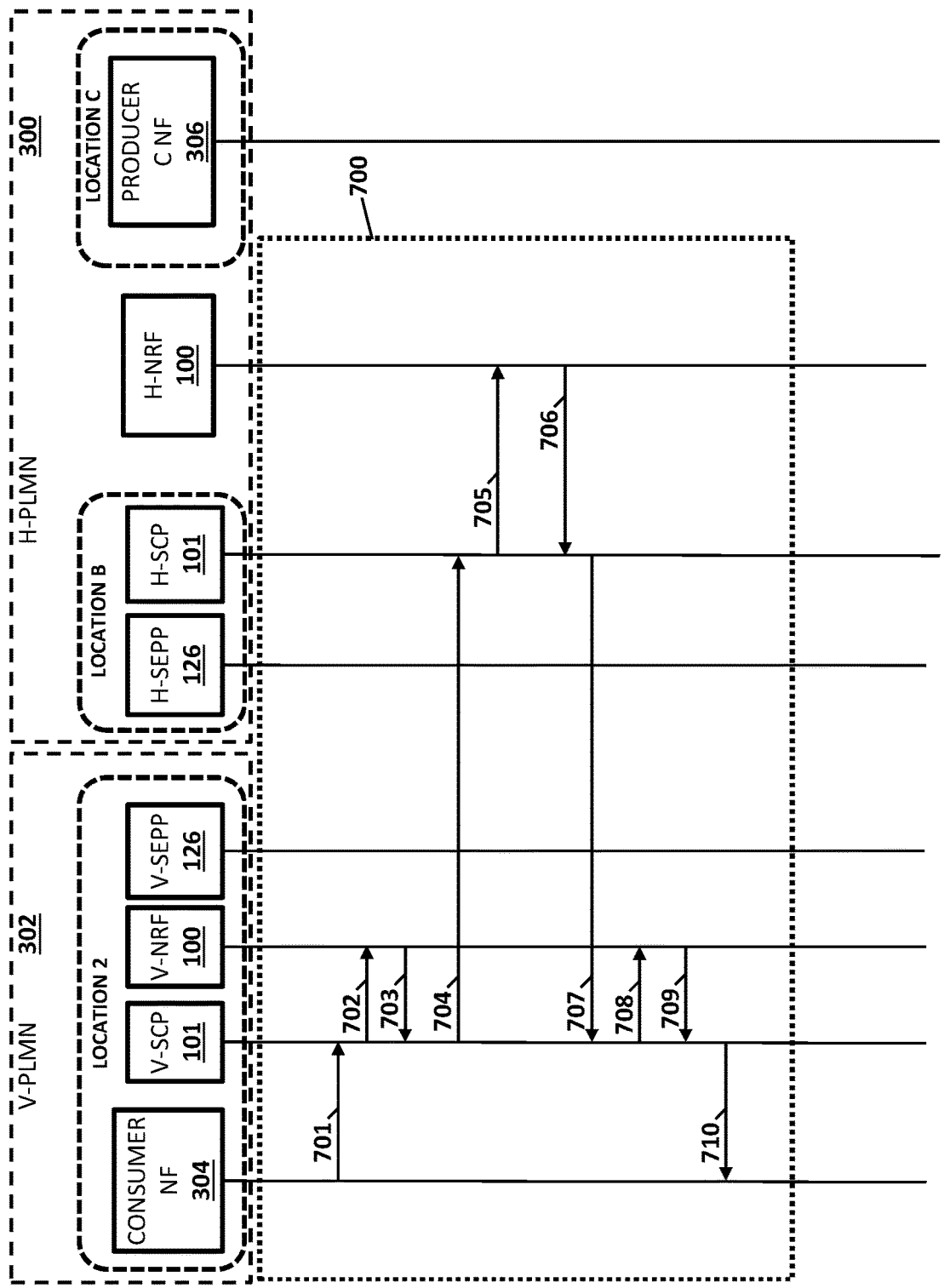
FIG. 7 is a message flow diagram illustrating an NF discovery procedure via a visited network service communication proxy (V-SCP) without using preferred-locality information.

FIG. 7 is a message flow diagram illustrating an NF discovery procedure 700 via V-SCP 101 without using preferred-locality information. In some embodiments, consumer NF 304 may send an NF discovery request to V-NRF 100 via V-SCP 101. In such embodiments, this communication mode or related setup may be associated with an indirect inter-PLMN communication model referred to as Model C in various 3GPP 5G standards. In some embodiments, V-SCP 101 (without PLM 204) may receive and send an NF discovery request to V-NRF 100 destined for H-NRF 100. In such embodiments, after receiving the NF discovery request, H-NRF 100 may provide an NF discovery response comprising NF profiles or other information (e.g., NF instance IDs) for identifying relevant NF instances.

Referring to FIG. 7, in step 701, an NF discovery request (e.g., an inter-PLMN NF discovery request) may be sent from consumer NF 304 in location '2' of V-PLMN 302 to V-SCP 101 in V-PLMN 302 for requesting NF instance(s) that can provide a particular service or related information from H-PLMN 300. The NF discovery request may lack a preferred-locality IE (e.g., a preferred-locality attribute or parameter). For example, consumer NF 304 may not insert preferred-locality information into an NF discovery request because consumer NF 304 may be unaware of relevant locality information of H-PLMN 300.

In step 702, the NF discovery request may be sent from V-SCP 101 to V-NRF 100.

In step 703, the NF discovery request may be sent from V-NRF 100 to V-SCP 101.

In step 704, the NF discovery request may be sent from V-SCP 101 to H-SCP 101 (e.g., via V-SEPP 126 and H-SEPP 126).

In step 705, the NF discovery request may be sent from H-SCP 101 to H-NRF 100.

In some embodiments, H-NRF 100 may receive an NF discovery request and select a number of NF profiles indicating producer NFs 306 for providing the service or information, e.g., based on various attributes or parameters in the NF discovery request.

In some embodiments, when an NF discovery request lacks preferred-locality information, H-NRF 100 may generate a list indicating producer NFs 306 that are un-prioritized relative to preferred-locality information.

In step 706, an NF discovery response comprising or indicating an unprioritized list indicating various producer NFs may be generated and sent from H-NRF 100 to H-SCP 101.

In step 707, the NF discovery response may be sent from H-SCP 101 to V-SCP 101 (e.g., via H-SEPP 126 and V-SEPP 126).

In step 708, the NF discovery response may be sent from V-SCP 101 to V-NRF 100.

In step 709, the NF discovery response may be sent from V-NRF 100 to V-SCP 101.

In step 710, the NF discovery response may be sent from V-SCP 101 to consumer NF 304.

In some embodiments, consumer NF 304 may select one of the producer NFs 306 indicated by the NF discovery response and may use a corresponding NF instance ID to request service or related data from producer C NF 306 in location 'C', e.g., via an SBI request. In such embodiments, usage of selected producer C NF 306 may yield inefficiencies (e.g., with respect to latency, throughput, and resource utilization) for communications between consumer NF 304 and selected producer NF 306 if both are located geographically apart (e.g., in different cities or states) and/or communicatively apart (e.g., slow or burdensome connectivity between the two NFs).

It will be appreciated that FIG. 7 is for illustrative purposes and that different and/or additional messages and/or actions may be used. It will also be appreciated that various messages and/or actions described herein may occur in a different order or sequence.

Figure 8:
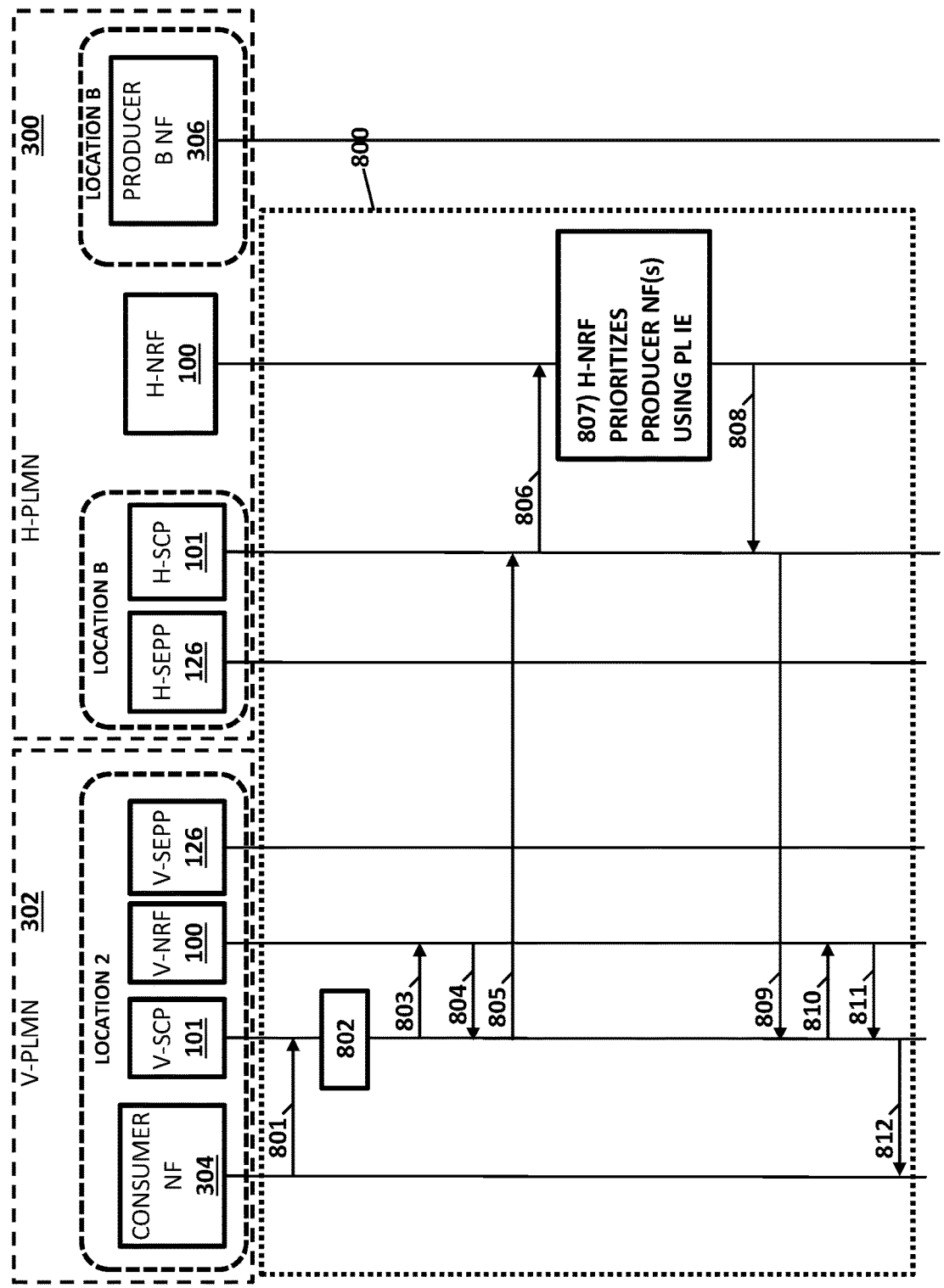
FIG. 8 is a message flow diagram illustrating an NF discovery procedure using preferred-locality information provided by a V-SCP.

FIG. 8 is a message flow diagram illustrating an NF discovery procedure 800 using preferred-locality information provided by V-SCP 101. In some embodiments, consumer NF 304 may send an NF discovery request to V-NRF 100 via V-SCP 101. In such embodiments, this communication mode or related setup may be associated with an indirect inter-PLMN communication model referred to as Model C in various 3GPP 5G standards.

In some embodiments, V-SCP 101 may include PLM 204 and may be capable of inserting or including preferred-locality information in NF discovery requests. In such embodiments, V-SCP 101 and/or PLM 204 may be configured for receiving an NF discovery request associated with consumer NF 304; determining that the NF discovery request is lacking relevant preferred-locality information; determining, using an NF instance ID associated with consumer NF 304 and locality data 400, a preferred-locality value (e.g., a data string or identifier); including the preferred-locality value in a preferred-locality IE (e.g., a parameter, an attribute, a field, etc.) of the NF discovery request; and transmitting the NF discovery request toward H-NRF 100, e.g., via SEPPs 126 and H-SCP 101. In such embodiments, after receiving the NF discovery request, H-NRF 100 may use the preferred-locality information to provide an NF discovery response comprising NF profiles or other information (e.g., NF instance IDs) for identifying relevant NF instances.

Referring to FIG. 8, in step 801, an NF discovery request (e.g., an inter-PLMN NF discovery request) may be sent from consumer NF 304 in location '2' of V-PLMN 302 to V-SCP 101 in V-PLMN 302 for requesting NF instance(s) that can provide a particular service or related information from H-PLMN 300. The NF discovery request may lack a preferred-locality IE (e.g., a preferred-locality attribute or parameter) or may include a preferred-locality IE. For example, consumer NF 304 may not insert preferred-locality information into an NF discovery request because consumer NF 304 may be unaware of relevant locality information of H-PLMN 300. In another example, consumer NF 304 may insert preferred-locality information into an NF discovery request that is irrelevant because consumer NF 304 may be unaware of relevant locality information of H-PLMN 300.

In step 802, V-SCP 101 may use an NF instance ID or an NF type associated with consumer NF 304 to identify a preferred-locality value from locality data 400 or a related data store and may include or insert the preferred-locality value in the NF discovery request or a version thereof.

In some embodiments, V-SCP 101 may override or replace an existing preferred-locality IE value (e.g., if the mapped or determined preferred-locality value) is different from the existing preferred-locality IE value.

In some embodiments, e.g., to determine or identify appropriate preferred-locality information for a given NF discovery request, V-SCP 101 may determine that a preferred-locality IE of a received NF discovery request is missing or irrelevant and, after determining that the preferred-locality IE is missing or irrelevant, V-SCP 101 may obtain or extract an NF instance ID of consumer NF 304 from a User-Agent header portion of the NF discovery request. V-SCP 101 may then identify locality information indicating the locality of consumer NF 304 from V-NRF 100 (e.g., profile registration data of consumer NF 304 stored at V-NRF 100) or other sources. Using the consumer NF locality information (e.g., a location name or identifier), V-SCP 101 may determine corresponding target PLMN preferred-locality information (e.g., a preferred-locality value) from a preconfigured data store indicating associations between consumer NF locality information and producer NF preferred-locality information.

In step 803, the modified NF discovery request with the preferred-locality information may be sent from V-SCP 101 to V-NRF 100.

In step 804, the modified NF discovery request may be sent from V-NRF 100 to V-SCP 101.

In step 805, the modified NF discovery request may be sent from V-SCP 101 to H-SCP 101 (e.g., via V-SEPP 126 and H-SEPP 126).

In step 806, the modified NF discovery request may be sent from H-SCP 101 to H-NRF 100.

In step 807, H-NRF 100 may receive the modified NF discovery request and may use the preferred-validity value in the NF discovery request to identify and prioritize a list indicating various producer NFs (e.g., indicating producer B NF 306 in location 'B' as the top choice) for providing the requested service or information. For example, a group of producer NFs 306 in a given NF discovery response may be sorted or prioritized based on preferred-locality information such that the order is based on how geographically close producer NFs 306 are to the preferred-locality value in the NF discovery request.

In step 808, an NF discovery response comprising or indicating a prioritized list indicating various producer NFs may be generated and sent from H-NRF 100 to H-SEPP 126 for forwarding to V-PLMN 302.

In step 809, the NF discovery response may be sent from H-SCP 101 to V-SCP 101 (e.g., via H-SEPP 126 and V-SEPP 126).

In step 810, the NF discovery response may be sent from V-SCP 101 to V-NRF 100.

In step 811, the NF discovery response may be sent from V-NRF 100 to V-SCP 101.

In step 812, the NF discovery response may be sent from V-SCP 101 to consumer NF 304.

In some embodiments, consumer NF 304 may select the first NF (e.g., producer NF 306 with the highest priority) in the prioritized list indicating various producer NFs 306 and may use a corresponding NF instance ID to request service or related data from that producer B NF 306 in location 'B', e.g., via an SBI request. In such embodiments, where consumer NF 304 and selected producer NF 306 are geographically or communicatively close (e.g., in the same city, at the same serving node, at the same data center, etc.), usage of selected producer B NF 306 may be more efficiently with respect to latency, throughput, and resource utilization than other producer NFs that are geographically and/or communicatively apart from consumer NF 304.

It will be appreciated that FIG. 8 is for illustrative purposes and that different and/or additional messages and/or actions may be used. It will also be appreciated that various messages and/or actions described herein may occur in a different order or sequence.

Figure 9:
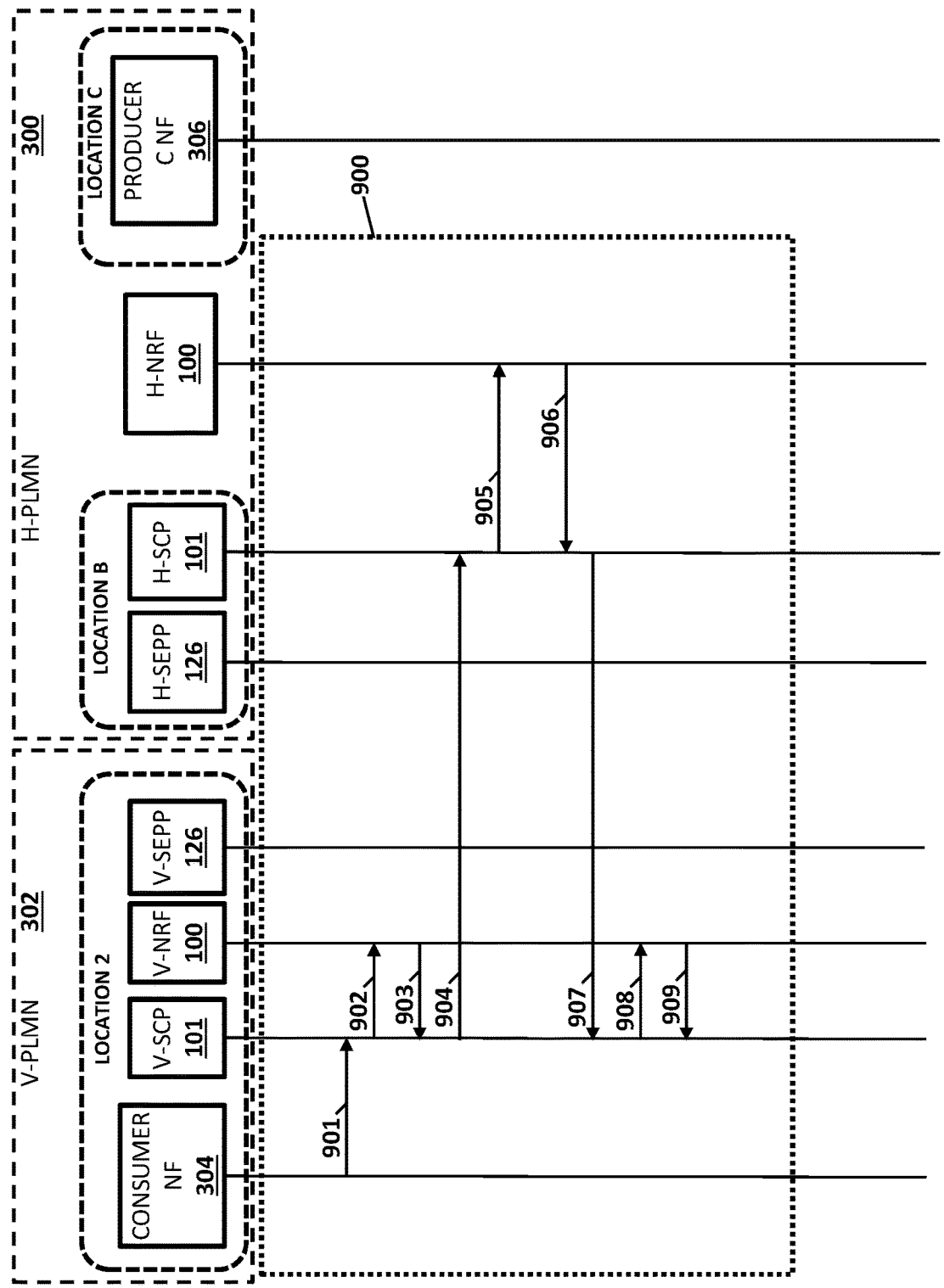
FIG. 9 is a message flow diagram illustrating an NF discovery procedure without using preferred-locality information and triggered by a service based interface (SBI) request.

FIG. 9 is a message flow diagram illustrating an NF discovery procedure 900 without using preferred-locality information and triggered by an SBI request. In some embodiments, consumer NF 304 may send an SBI request for triggering V-SCP 101 to generate and send an NF discovery request to V-NRF 100. In such embodiments, this communication mode or related setup may be associated with an indirect inter-PLMN communication model referred to as Model D in various 3GPP 5G standards.

In some embodiments, V-SCP 101 (without PLM 204) may receive an SBI request for NF discovery from consumer NF 304 and may generate and send an NF discovery request to V-NRF 100 destined for H-NRF 100. In such embodiments, after receiving the NF discovery request, H-NRF 100 may provide an NF discovery response comprising NF profiles or other information (e.g., NF instance IDs) for identifying relevant NF instances.

Referring to FIG. 9, in step 901, an SBI request (e.g., an 3gpp-Sbi-Discovery message) may be sent from consumer NF 304 in location '2' of V-PLMN 302 to V-SCP 101 in V-PLMN 302 for requesting NF instance(s) that can provide a particular service or related information from H-PLMN 300. The NF discovery request may lack a preferred-locality IE (e.g., a 3gpp-Sbi-Discovery-preferred-locality header or a query parameter). For example, consumer NF 304 may not include a preferred-locality header or a query parameter into an SBI request because consumer NF 304 may be unaware of relevant locality information of H-PLMN 300.

In step 902, after receiving the SBI request, an NF discovery request may be generated and sent from V-SCP 101 to V-NRF 100.

In step 903, the NF discovery request may be sent from V-NRF 100 to V-SCP 101.

In step 904, the NF discovery request may be sent from V-SCP 101 to H-SCP 101 (e.g., via V-SEPP 126 and H-SEPP 126).

In step 905, the NF discovery request may be sent from H-SCP 101 to H-NRF 100.

In some embodiments, H-NRF 100 may receive an NF discovery request and select a number of NF profiles indicating producer NFs 306 for providing the service or information, e.g., based on various attributes or parameters in the NF discovery request.

In some embodiments, when an NF discovery request lacks preferred-locality information, H-NRF 100 may generate a list indicating producer NFs 306 that are un-prioritized relative to preferred-locality information.

In step 906, an NF discovery response comprising or indicating an unprioritized list indicating various producer NFs may be generated and sent from H-NRF 100 to H-SCP 101.

In step 907, the NF discovery response may be sent from H-SCP 101 to V-SCP 101 (e.g., via H-SEPP 126 and V-SEPP 126).

In step 908, the NF discovery response may be sent from V-SCP 101 to V-NRF 100.

In step 909, the NF discovery response may be sent from V-NRF 100 to V-SCP 101.

In some embodiments, V-SCP 101 may select one of the producer NFs 306 indicated by the NF discovery response and may use a corresponding NF instance ID to request service or related data from producer C NF 306 in location 'C', e.g., via an SBI request. In such embodiments, usage of selected producer C NF 306 may yield inefficiencies (e.g., with respect to latency, throughput, and resource utilization) for communications between V-SCP 101 and selected producer NF 306 if both are located geographically apart (e.g., in different cities or states) and/or communicatively apart (e.g., slow or burdensome connectivity between the two NFs).

It will be appreciated that FIG. 9 is for illustrative purposes and that different and/or additional messages and/or actions may be used. It will also be appreciated that various messages and/or actions described herein may occur in a different order or sequence.

Figure 10:
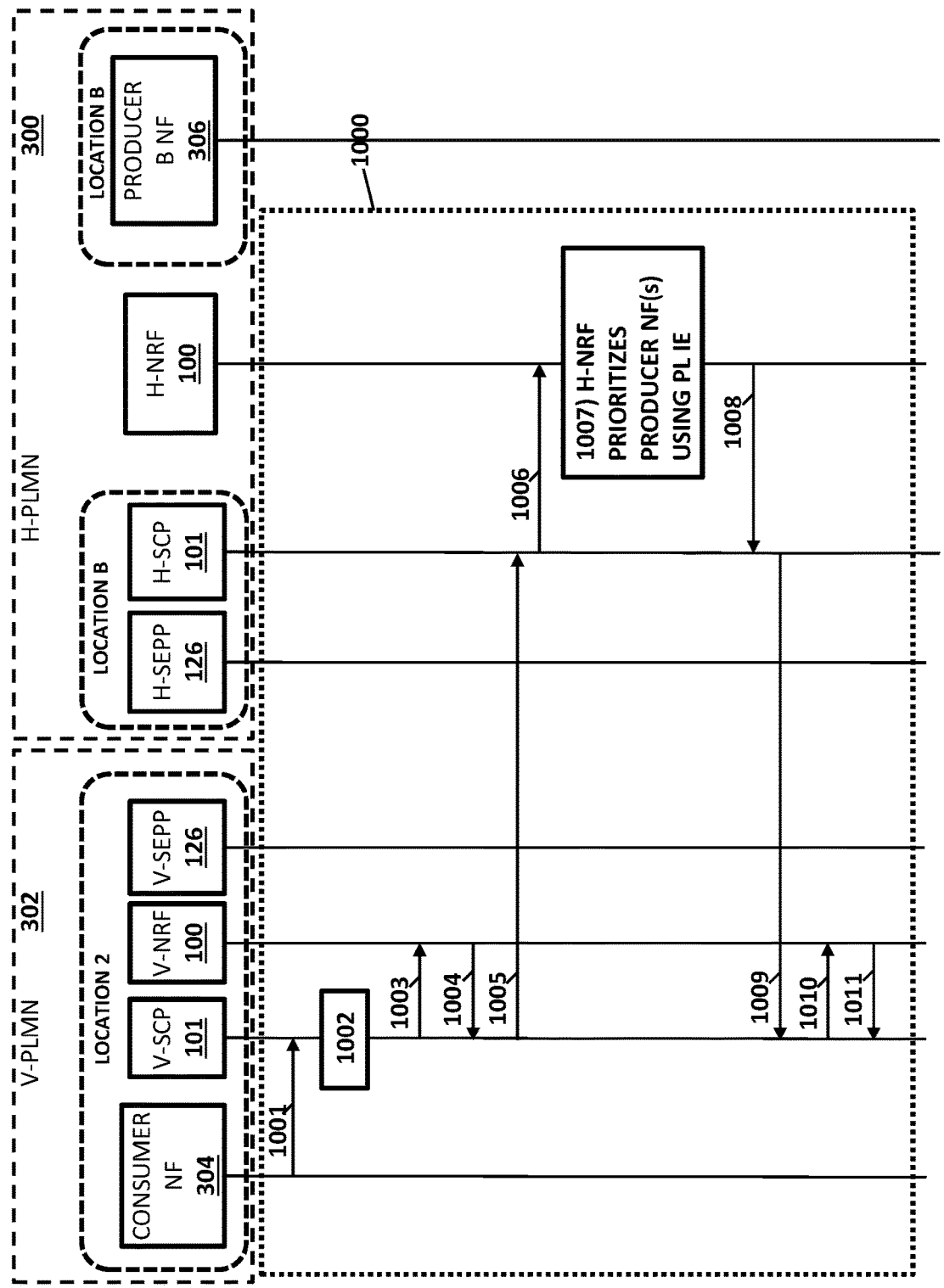
FIG. 10 is a message flow diagram illustrating an NF discovery procedure using preferred-locality information provided by a V-SCP and triggered by an SBI request.

FIG. 10 is a message flow diagram illustrating an NF discovery procedure 1000 using preferred-locality information provided by V-SCP 101 and triggered by an SBI request. In some embodiments, consumer NF 304 may send an SBI request for triggering V-SCP 101 to generate and send an NF discovery request to V-NRF 100. In such embodiments, this communication mode or related setup may be associated with an indirect inter-PLMN communication model referred to as Model D in various 3GPP 5G standards.

In some embodiments, V-SCP 101 may include PLM 204 and may be capable of generating NF discovery requests that includes preferred-locality information. In such embodiments, V-SCP 101 and/or PLM 204 may be configured for receiving an SBI request for NF discovery from consumer NF 304; determining that the SBI request is lacking relevant preferred-locality information; determining, using an NF instance ID associated with consumer NF 304 and locality data 400, a preferred-locality value (e.g., a data string or identifier); including the preferred-locality value in a preferred-locality IE (e.g., a parameter, an attribute, a field, etc.) of an NF discovery request; and transmitting the NF discovery request toward H-NRF 100, e.g., via SEPPs 126 and H-SCP 101. In such embodiments, after receiving the NF discovery request, H-NRF 100 may use the preferred-locality information to provide an NF discovery response comprising NF profiles or other information (e.g., NF instance IDs) for identifying relevant NF instances.

Referring to FIG. 10, in step 1001, an SBI request (e.g., an inter-PLMN 5G SBI service request with 3gpp-Sbi-Discovery headers) may be sent from consumer NF 304 in location '2' of V-PLMN 302 to V-SCP 101 in V-PLMN 302 for requesting NF instance(s) that can provide a particular service or related information from H-PLMN 300. The NF discovery request may lack a preferred-locality IE (e.g., a preferred-locality attribute or parameter) or may include a preferred-locality IE. For example, consumer NF 304 may not insert preferred-locality information into an NF discovery request because consumer NF 304 may be unaware of relevant locality information of H-PLMN 300. In another example, consumer NF 304 may insert preferred-locality information into an NF discovery request that is irrelevant because consumer NF 304 may be unaware of relevant locality information of H-PLMN 300.

In step 1002, after receiving the SBI request, V-SCP 101 may use an NF instance ID or an NF type associated with consumer NF 304 to identify a preferred-locality value from locality data 400 or a related data store and may generate an NF discovery request that includes the preferred-locality value.

In some embodiments, V-SCP 101 may override or replace an existing preferred-locality IE value (e.g., if the mapped or determined preferred-locality value) is different from the existing preferred-locality IE value.

In some embodiments, e.g., to determine or identify appropriate preferred-locality information for a given NF discovery request, V-SCP 101 may determine that a preferred-locality IE (e.g., an SBI query parameter) of a received SBI request is missing or irrelevant and, after determining that the preferred-locality IE is missing or irrelevant, V-SCP 101 may obtain or extract an NF instance ID of consumer NF 304 from a User-Agent header portion of the SBI request. V-SCP 101 may then identify locality information indicating the locality of consumer NF 304 from V-NRF 100 (e.g., profile registration data of consumer NF 304 stored at V-NRF 100) or other sources. Using the consumer NF locality information (e.g., a location name or identifier), V-SCP 101 may determine corresponding target PLMN preferred-locality information (e.g., a preferred-locality value) from a preconfigured data store indicating associations between consumer NF locality information and producer NF preferred-locality information.

In step 1003, the NF discovery request with the preferred-locality information may be sent from V-SCP 101 to V-NRF 100.

In step 1004, the NF discovery request may be sent from V-NRF 100 to V-SCP 101.

In step 1005, the NF discovery request may be sent from V-SCP 101 to H-SCP 101 (e.g., via V-SEPP 126 and H-SEPP 126).

In step 1006, the NF discovery request may be sent from H-SCP 101 to H-NRF 100.

In step 1007, H-NRF 100 may receive the NF discovery request and may use the preferred-validity value in the NF discovery request to identify and prioritize a list indicating various producer NFs (e.g., indicating producer B NF 306 in location 'B' as the top choice) for providing the requested service or information. For example, a group of producer NFs 306 in a given NF discovery response may be sorted or prioritized based on preferred-locality information such that the order is based on how geographically close producer NFs 306 are to the preferred-locality value in the NF discovery request.

In step 1008, an NF discovery response comprising or indicating a prioritized list indicating various producer NFs may be generated and sent from H-NRF 100 to H-SEPP 126 for forwarding to V-PLMN 302.

In step 1009, the NF discovery response may be sent from H-SCP 101 to V-SCP 101 (e.g., via H-SEPP 126 and V-SEPP 126).

In step 1010, the NF discovery response may be sent from V-SCP 101 to V-NRF 100.

In step 1011, the NF discovery response may be sent from V-NRF 100 to V-SCP 101.

In some embodiments, V-SCP 101 may select the first NF (e.g., producer NF 306 with the highest priority) in the prioritized list indicating various producer NFs 306 and may use a corresponding NF instance ID to request service or related data from that producer B NF 306 in location 'B', e.g., via an SBI request. In such embodiments, where V-SCP 101 and selected producer NF 306 are geographically or communicatively close (e.g., in the same city, at the same serving node, at the same data center, etc.), usage of selected producer B NF 306 may be more efficiently with respect to latency, throughput, and resource utilization than other producer NFs that are geographically and/or communicatively apart from V-SCP 101.

It will be appreciated that FIG. 10 is for illustrative purposes and that different and/or additional messages and/or actions may be used. It will also be appreciated that various messages and/or actions described herein may occur in a different order or sequence.

Figure 11:
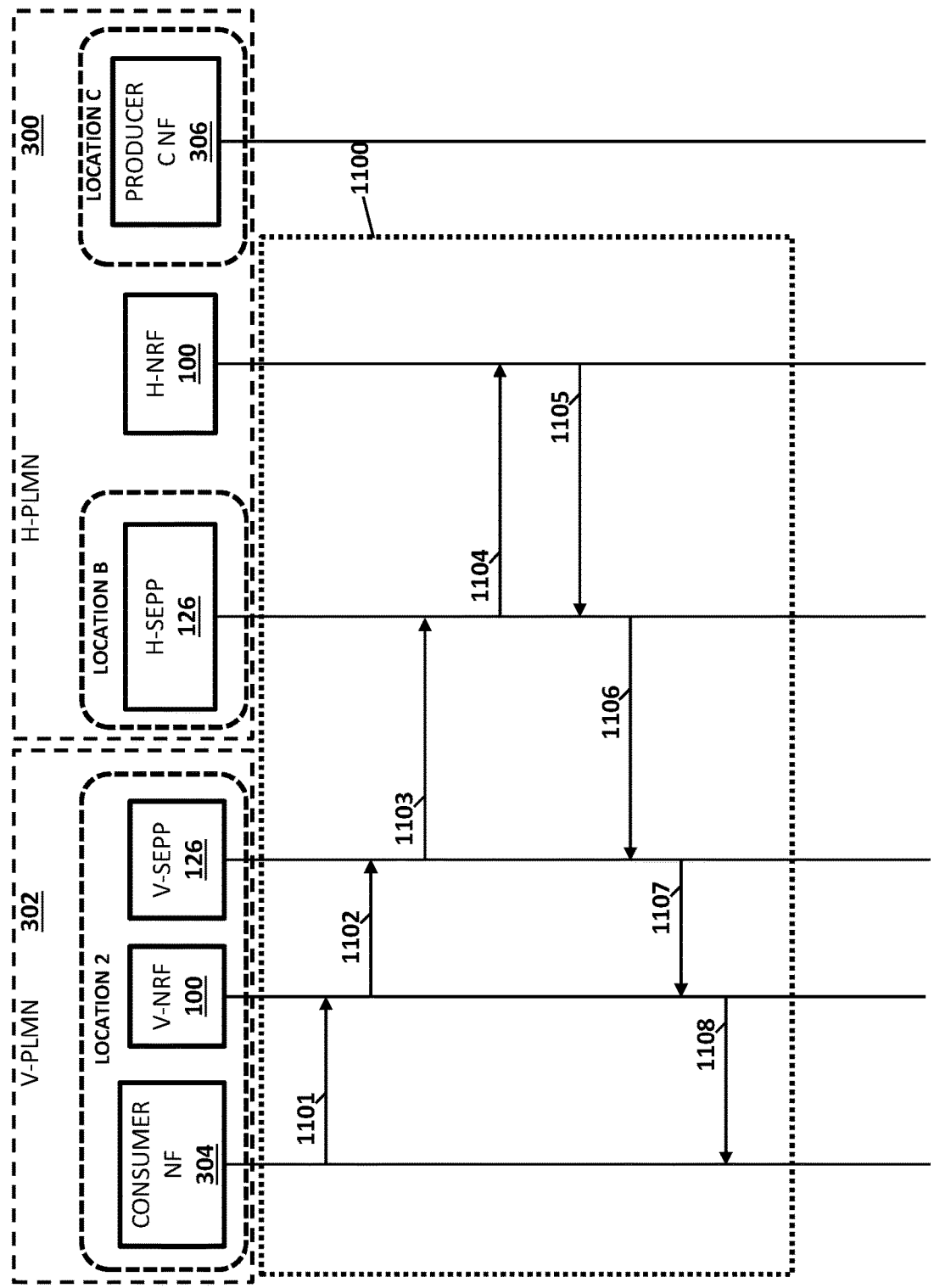
FIG. 11 is a message flow diagram illustrating an NF discovery procedure without using preferred-locality information provided by a home network security edge protection proxy (H-SEPP)

FIG. 11 is a message flow diagram illustrating an NF discovery procedure 1100 without using preferred-locality information provided by H-SEPP 126. In some embodiments, H-SEPP 126 (without PLM 204) may receive and send an NF discovery request to H-NRF 100. In such embodiments, after receiving the NF discovery request, H-NRF 100 may provide an NF discovery response comprising NF profiles or other information (e.g., NF instance IDs) for identifying relevant NF instances.

Referring to FIG. 11, in step 1101, an NF discovery request (e.g., an inter-PLMN NF discovery request) may be sent from consumer NF 304 in location '2' of V-PLMN 302 to V-NRF 100 in V-PLMN 302 for requesting NF instance(s) that can provide a particular service or related information from H-PLMN 300. The NF discovery request may lack a preferred-locality IE (e.g., a preferred-locality attribute or parameter). For example, consumer NF 304 may not insert preferred-locality information into an NF discovery request because consumer NF 304 may be unaware of relevant locality information of H-PLMN 300.

In step 1102, the NF discovery request may be sent from V-NRF 100 to V-SEPP 126 for forwarding to H-NRF 100 in H-PLMN 300.

In step 1103, the NF discovery request (e.g., as an HTTP/2 message) may be forwarded from V-SEPP 126 to H-SEPP 126 (e.g., a primary SEPP of H-PLMN 300 in location 'B') via an N32-f interface.

In step 1104, the NF discovery request may be sent from H-SEPP 126 to H-NRF 100. For example, H-NRF 100 may receive an NF discovery request and select a number of NF profiles indicating producer NFs 306 for providing the service or information, e.g., based on various attributes or parameters in the NF discovery request.

In some embodiments, when an NF discovery request lacks preferred-locality information, H-NRF 100 may generate a list indicating producer NFs 306 that are un-prioritized relative to preferred-locality information.

In step 1105, an NF discovery response comprising or indicating an unprioritized list indicating various producer NFs may be generated and sent from H-NRF 100 to H-SEPP 126 for forwarding to V-PLMN 302.

In step 1106, the NF discovery response (e.g., as an HTTP/2 message) may be forwarded from H-SEPP 126 to V-SEPP 126 via an N32-f interface.

In step 1107, the NF discovery response may be sent from V-SEPP 126 to V-NRF 100.

In step 1108, the NF discovery response may be sent from V-NRF 100 to consumer NF 304.

In some embodiments, consumer NF 304 may select one of the producer NFs 306 indicated by the NF discovery response and may use a corresponding NF instance ID to request service or related data from producer C NF 306 in location 'C', e.g., via an SBI request. In such embodiments, usage of selected producer C NF 306 may yield inefficiencies (e.g., with respect to latency, throughput, and resource utilization) for communications between consumer NF 304 and selected producer NF 306 if both are located geographically apart (e.g., in different cities or states) and/or communicatively apart (e.g., slow or burdensome connectivity between the two NFs).

It will be appreciated that FIG. 11 is for illustrative purposes and that different and/or additional messages and/or actions may be used. It will also be appreciated that various messages and/or actions described herein may occur in a different order or sequence.

Figure 12:
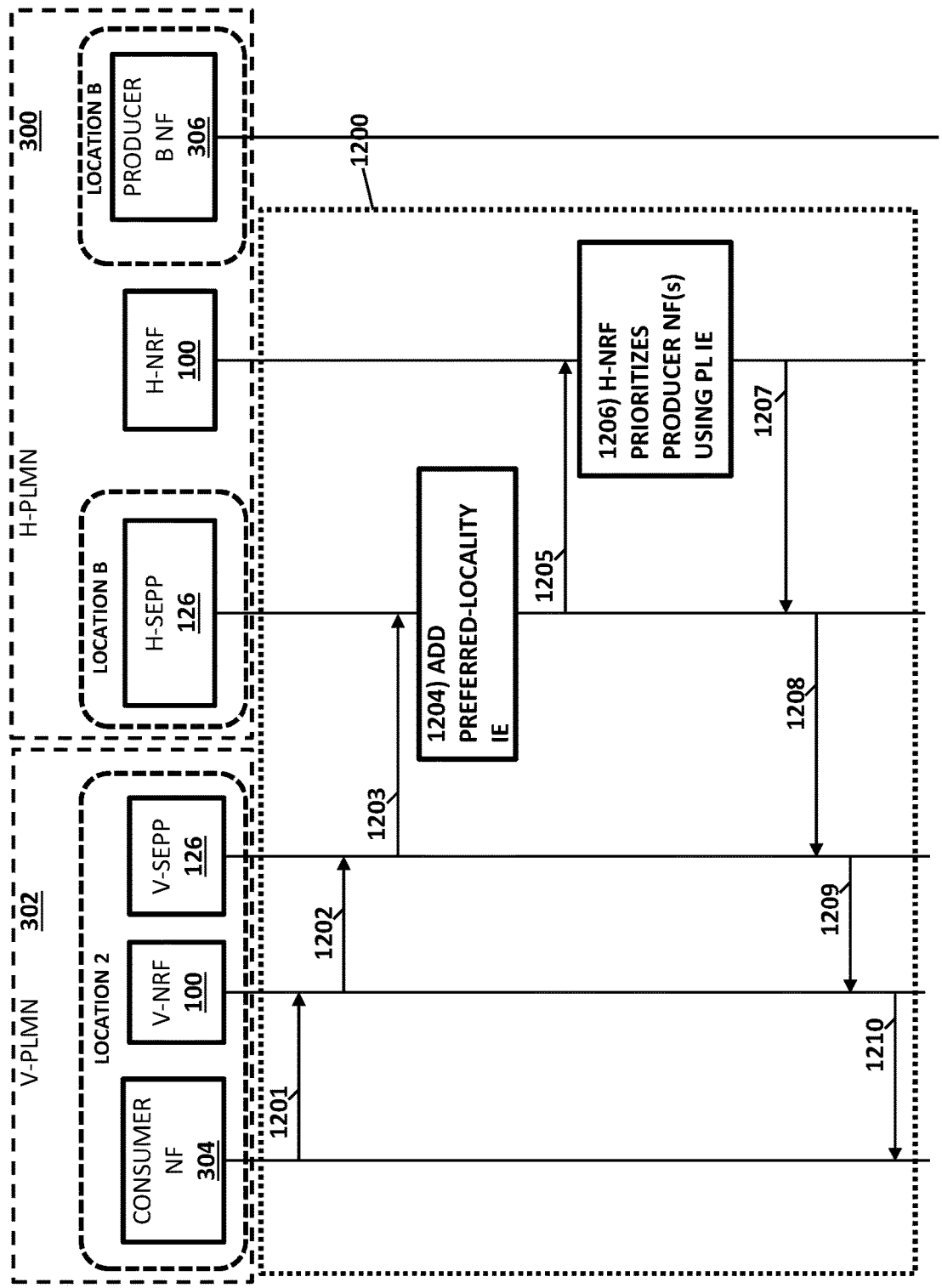
FIG. 12 is a message flow diagram illustrating an NF discovery procedure using preferred-locality information provided by a H-SEPP.

FIG. 12 is a message flow diagram illustrating an NF discovery procedure 1200 using preferred-locality information provided by H-SEPP 126. In some embodiments, H-SEPP 126 may include PLM 204 and may be capable of including or inserting preferred-locality information in NF discovery requests. For example, H-SEPP 126 and/or PLM 204 therein may be configured for determining that the NF discovery request is lacking relevant preferred-locality information, including a preferred-locality value based on the location of H-SEPP 126 for a preferred-locality IE of the NF discovery request; and transmitting the NF discovery request to H-NRF 100.

Referring to FIG. 12, in step 1201, an NF discovery request (e.g., an inter-PLMN NF discovery request) may be sent from consumer NF 304 (e.g., AMF 110) in location '2' of V-PLMN 302 to V-NRF 100 in V-PLMN 302 for requesting NF instance(s) that can provide a particular service or related information from H-PLMN 300. The NF discovery request may lack a preferred-locality IE (e.g., a preferred-locality attribute or parameter). For example, consumer NF 304 may not insert preferred-locality information into an NF discovery request because consumer NF 304 may be unaware of relevant locality information of H-PLMN 300.

In step 1202, the NF discovery request may be sent from V-NRF 100 to V-SEPP 126 for forwarding to H-NRF 100 in H-PLMN 300.

In step 1203, the NF discovery request (e.g., as an HTTP/2 message) may be forwarded from V-SEPP 126 to H-SEPP 126 (e.g., a primary SEPP of H-PLMN 300 in location 'B') via an N32-f interface.

In step 1204, H-SEPP 126 may add or insert a preferred-locality value in the NF discovery request or a version thereof. For example, H-SEPP 126 may use its own location or related locality information as a preferred-locality value in the NF discovery request. In another example, H-SEPP 126 may use an NF instance ID or an NF type associated with consumer NF 304 to identify a preferred-locality value from locality data 400 or a related data store and may include or insert the preferred-locality value in the NF discovery request or a version thereof.

In some embodiments, H-SEPP 126 may add the preferred locality IE with its own location or locality only in scenarios where the preferred locality IE is not provided and H-SEPP 126 is configured to do so, e.g., by a network operator.

In step 1205, the modified NF discovery request with the preferred-locality value may be sent from H-SEPP 126 to H-NRF 100.

In step 1206, H-NRF 100 may receive the modified NF discovery request and may use the preferred-validity value in the NF discovery request to identify and prioritize a list indicating various producer NFs (e.g., indicating producer B NF 306 in location 'B' as the top choice) for providing the requested service or information. For example, a group of producer NFs 306 in a given NF discovery response may be sorted or prioritized based on preferred-locality information such that the order is based on how geographically close producer NFs 306 are to the preferred-locality value in the NF discovery request.

In step 1207, an NF discovery response comprising or indicating a prioritized list indicating various producer NFs may be generated and sent from H-NRF 100 to H-SEPP 126 for forwarding to V-PLMN 302.

In step 1208, the NF discovery response (e.g., as an HTTP/2 message) may be forwarded from H-SEPP 126 to V-SEPP 126 via an N32-f interface.

In step 1209, the NF discovery response may be sent from V-SEPP 126 to V-NRF 100.

In step 1210, the NF discovery response may be sent from V-NRF 100 to consumer NF 304.

In some embodiments, consumer NF 304 may select the first NF (e.g., producer NF 306 with the highest priority) in the prioritized list indicating various producer NFs 306 and may use a corresponding NF instance ID to request service or related data from that producer B NF 306 in location 'B', e.g., via an SBI request. In such embodiments, where consumer NF 304 and selected producer NF 306 are geographically or communicatively close (e.g., in the same city, at the same serving node, at the same data center, etc.), usage of selected producer B NF 306 may be more efficiently with respect to latency, throughput, and resource utilization than other producer NFs that are geographically and/or communicatively apart from consumer NF 304.

It will be appreciated that FIG. 12 is for illustrative purposes and that different and/or additional messages and/or actions may be used. It will also be appreciated that various messages and/or actions described herein may occur in a different order or sequence.

Figure 13:
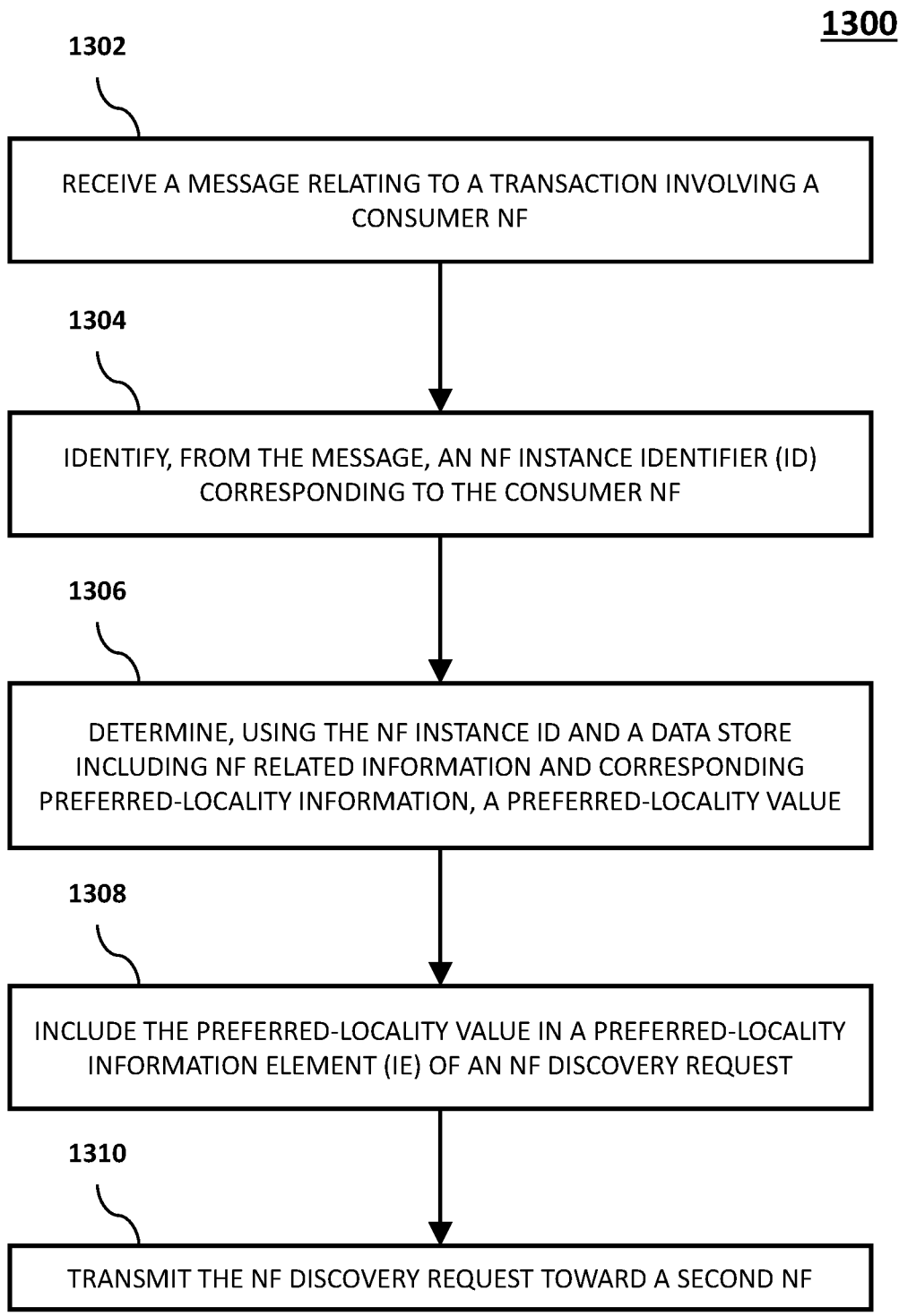
FIG. 13 is a flow chart illustrating an example process for NF discovery using preferred-locality information.

FIG. 13 is a diagram illustrating an example process 1300 for NF discovery using preferred-locality information. In some embodiments, example process 1300 described herein, or portions (e.g., steps) thereof, may be performed at or performed by NF 200, NRF 100, SCP 101, SEPP 126, PLM 204, and/or another module, NF, or node.

Referring to process 1300, in step 1302, a message relating to a transaction involving a consumer NF may be received. For example, NF 200 may receive a request related to NF discovery, e.g., an inter-PLMN NF discovery request or an SBI request with one or more 3gpp-Sbi-Discovery headers.

In some embodiments, receiving a message relating to a transaction involving a consumer NF may include receiving an SBI request from the consumer NF. In such embodiments, it may be determined (e.g., by NF 200 or PLM 204) that the SBI request is lacking relevant preferred-locality information (e.g., a preferred-locality IE).

In some embodiments, identifying an NF instance ID (e.g., corresponding to or indicating consumer NF 304) from an SBI request may include obtaining the NF instance ID from a User-Agent header of the SBI request. In such embodiments, in response to the SBI request, an NF discovery request may be generated by a first NF (e.g., NF 200) and may include appropriate preferred-locality information.

In some embodiments, receiving a message relating to a transaction involving a consumer NF may include receiving an NF discovery request from a consumer NF and determining that the NF discovery request may be lacking relevant preferred-locality information (e.g., a preferred-locality IE).

In some embodiments, identifying an NF instance ID (e.g., corresponding to or indicating consumer NF 304) from an NF discovery request may include obtaining the NF instance ID from a User-Agent header of the NF discovery request. In such embodiments, the NF discovery request may be modified by a first NF (e.g., NF 200) to include appropriate preferred-locality information.

In step 1304, an NF instance ID corresponding to consumer NF 304 may be identified from the message. For example, NF 200 may extract or identify an NF instance ID from a User-Agent header portion of an NF discovery request or an SBI request.

In step 1306, it may be determined, using the NF instance ID and a data store including NF related information and corresponding preferred-locality information, a preferred-locality value. For example, NF 200 or PLM 204 therein may be configured for querying a locality related data store (e.g., locality data 400) using an NF instance ID associated with consumer NF 304 and/or other consumer NF information to identify appropriate preferred-locality information associated with consumer NF 304.

In some embodiments, determining a preferred-locality value (e.g., for a preferred-validity IE in an NF discovery request) using locality data 400 (or a related data store) may include determining an NF type associating with a consumer NF using a NF instance ID corresponding to the consumer NF; determining an NF type associated with a target or requested producer NF (e.g., using a received SBI request or an NF discovery request); determining identify locality information indicating the locality of the consumer NF using the NF instance ID (e.g., by obtaining an NF profile from H-NRF 100 or from NF registration and/or topology information accessible by V-NRF 100); and then using the NF type associated with the consumer NF, the NF type associated with producer the NF, and the locality of the consumer NF to identify a corresponding preferred-locality value.

In some embodiments, determining a preferred-locality value (e.g., for a preferred-validity IE in an NF discovery request) using locality data 400 (or a related data store) may include obtaining, using an NF instance ID, NF profile information associated with a consumer NF, wherein the NF profile information may include consumer NF locality information; and determining, using the consumer NF locality information and a data store including NF related information and corresponding preferred-locality information, the preferred-locality value.

In some embodiments, the NF related information and the corresponding preferred-locality information (e.g., locality data 400) may be provided or provisioned by a network operator, e.g., prior to receiving an SBI request or an NF discovery request from a consumer NF.

In step 1308, the preferred-locality value may be included in a preferred-locality IE of an NF discovery request.

In step 1310, the NF discovery request may be transmitted toward a second NF.

In some embodiments, a first NF (e.g., NF 200) may include V-NRF 100.

In some embodiments, a first NF (e.g., NF 200) may include V-SCP 101 or H-SCP 101.

In some embodiments, a second NF (e.g., an NF that receives an NF discovery request from NF 200) may include V-NRF 100 or H-NRF 100.

It will be appreciated that process 1300 is for illustrative purposes and that different and/or additional actions may be used. It will also be appreciated that various actions described herein may occur in a different order or sequence.

It will be appreciated that while some aspects of the subject matter described herein has been discussed with reference to 5G networks various other networks may utilize some aspects of the subject matter described herein. For example, any network that allows or utilizes preferred-locality information (e.g., related attributes or parameters) may use features, mechanisms and techniques described herein to perform or facilitate efficient NF discovery using preferred-locality information, e.g., by having an intermediate node add or insert a preferred-locality IE in an NF discovery request.

It should be noted that NF 200, PLM 204, and/or functionality described herein may constitute a special purpose computing device. Further, NF 200, PLM 204, and/or functionality described herein can improve the technological field of NF discovery, prioritizing producer NFs 306 based on preferred-locality information identified using preconfigured mapping data, and/or related resource utilization in a communications network. For example, NF 200 may include PLM 204 and may be capable of including or inserting preferred-locality information in NF discovery requests. In this example, NF 200 and/or PLM 204 may be configured for receiving a request (e.g., an NF discovery request or an SBI request with 3gpp-Sbi-Discovery headers) associated with consumer NF 304; determining that the request is lacking relevant preferred-locality information; determining, using an NF instance ID associated with consumer NF 304, a preferred-locality value (e.g., a data string or identifier); including the preferred-locality value in a preferred-locality IE (e.g., a parameter, an attribute, a field, etc.) of an NF discovery request; and transmitting the NF discovery request toward H-NRF 100 or another node.

The disclosure of each of the following references is incorporated herein by reference in its entirety to the extent not inconsistent herewith and to the extent that it supplements, explains, provides a background for, or teaches methods, techniques, and/or systems employed herein.

REFERENCES 1. 3GPP TS 29.501; 3rd Generation Partnership Project; Technical Specification Group Services and System Aspects; System architecture for the 5G System (5GS); Stage 3 (Release 17); V17.2.0 (2021-06).
2. 3GPP TS 29.510; 3rd Generation Partnership Project; Technical Specification Group Core Network and Terminals; 5G System; Network Function Repository Services; Stage 3 (Release 17); V17.2.0 (2021-06).
3. 3GPP TS 29.500; 3rd Generation Partnership Project; Technical Specification Group Core Network and Terminals; 5G System; Technical Realization of Service Based Architecture; Stage 3 (Release 17); V17.3.0 (2021-06).
4. 3GPP TS 29.573; 3rd Generation Partnership Project; Technical Specification Group Core Network and Terminals; 5G System; Public Land Mobile Network (PLMN) Interconnection; Stage 3 (Release 17); V17.1.0 (2021-06).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for network function (NF) discovery using preferred-locality information, the method comprising:
at a first network function (NF) comprising at least one processor:
receiving a message relating to a transaction involving a consumer NF, wherein receiving the message relating to the transaction involving the consumer NF includes receiving an NF discovery request from the consumer NF and determining that the NF discovery request is lacking relevant preferred-locality information;
identifying, from the message, an NF instance identifier (ID) corresponding to the consumer NF. wherein identifying the NF instance ID from the message includes obtaining the NF instance ID from a User-Agent header of the NF discover request and wherein the NF discovery request is modified by the first NF;
determining, using the NF instance ID and a data store including NE related information and corresponding preferred-locality information, a preferred-locality value;
including the preferred-locality value in a preferred-locality information element (IE) of the NF discovery request; and
transmitting the NE discovery request toward a second NF.

2. The method of claim 1 wherein determining the preferred-locality value comprises:
obtaining, using the NF instance ID, NF profile information associated with the consumer NF, wherein the NF profile information includes consumer NF locality information; and
determining, using the consumer NF locality information and the data store, the preferred-locality value.

3. The method of claim 1 wherein the NF related information and the corresponding preferred-locality information is provided or provisioned by a network operator prior to receiving a service based interface (SBI) request or the NE discovery request from the consumer NF.

4. The method of claim 1 wherein the first NF includes a visited network service communication proxy (V-SCP) or a visited network NF repository function (V-NRF).

5. The method of claim 1 wherein the second NF includes a visited network NF repository function (V-NRF) ora home network NF repository function (H-NRF).

6. A system for network function (NF) discovery using preferred-locality information, the system comprising:

at least one processor;
a memory; and
a first network function (NF) implemented using the at least one processor and the memory, the first NF configured for:
receiving a message relating to a transaction involving a consumer NF, wherein receiving the message relating to the transaction involving the consumer NF includes receiving the NF discovery request from the consumer NF and determining that the NF discovery request is lacking relevant preferred-locality information;
identifying, from the message, an NF instance identifier (ID) corresponding to the consumer NF, wherein identifying the NF instance ID from the message includes obtaining the NF instance ID from a User-Agent header of the NF discovery request and wherein the NF discovery request is modified by the first NF;
determining, using the NF instance ID and a data store including NF related information and corresponding preferred-locality information, a preferred-locality value;
including the preferred-locality value in a preferred-locality information element (IE) of an NF discovery request; and
transmitting the NF discovery request toward a second NF.

7. The system of claim 6 wherein the first NF is configured for:
obtaining, using the NF instance ID, NF profile information associated with the consumer NF, wherein the NF profile information includes consumer NF locality information; and
determining, using the consumer NF locality information and the data store, the preferred-locality value.

8. The system of claim 6 wherein the NF related information and the corresponding preferred-locality information is provided or provisioned by a network operator prior to receiving a service based interface (SBI) request or the NF discovery request from the consumer NF.

9. The system of claim 6 wherein the first NF includes a visited network NF repository function (V-NRF) and wherein the second NF includes a home network NF repository function (H-NRF).

10. The system of claim 6 wherein the first NF includes a visited network service communication proxy (V-SCP) or a visited network NF repository function (V-NRF).

11. The system of claim 6 wherein the second NF includes a visited network NF repository function (V-NRF) or a home network NE repository function (H-NRF).

12. A non-transitory computer readable medium having stored thereon executable instructions that when executed by at least one processor of a computer cause the computer to perform steps comprising:
at a first network function (NF) comprising at least one processor:
receiving a message relating to a transaction involving a consumer NF, wherein receiving the message relating to the transaction involving the consumer NF includes receiving the NF discovery request from the consumer NF and determining that the NF discovery request is lacking relevant preferred-locality information;
identifying, from the message, an NF instance identifier (ID) corresponding to the consumer NF, wherein identifying the NF instance ID from the message includes obtaining the NF instance ID from a User-Agent header of the NF discovery request and wherein the NF discovery request is modified by the first NF;

determining, using the NF instance ID and a data store including NF related information and corresponding preferred-locality information, a preferred-locality value;

including the preferred-locality value in a preferred-locality information element (IE) of an NE discovery request; and transmitting the NE discovery request toward a second NF.

* * * * *

UNITED STATES PATENT AND TRADEMARK OFFICE
CERTIFICATE OF CORRECTION

PATENT NO. : 11,871,309 B2
APPLICATION NO. : 17/487142
DATED : January 9, 2024
INVENTOR(S) : Jayaramachar et al.

It is certified that error appears in the above-identified patent and that said Letters Patent is hereby corrected as shown below:

In the Specification

In Column 13, Line 34, delete "may de" and insert -- may be --, therefor.

In Column 13, Line 44, delete "fora" and insert -- for a --, therefor.

In the Claims

In Column 27, Line 33, in Claim 1, delete "NF." and insert -- NF, --, therefor.

In Column 27, Line 36, in Claim 1, delete "discover" and insert -- discovery --, therefor.

In Column 27, Line 39, in Claim 1, delete "NE" and insert -- NF --, therefor.

In Column 27, Line 45, in Claim 1, delete "NE" and insert -- NF --, therefor.

In Column 27, Line 58, in Claim 3, delete "NE" and insert -- NF --, therefor.

In Column 27, Line 64, in Claim 5, delete "ora" and insert -- or a --, therefor.

In Column 28, Line 51, in Claim 11, delete "NE" and insert -- NF --, therefor.

In Column 29, Line 8, in Claim 12, delete "NE" and insert -- NF --, therefor.

In Column 29, Line 10, in Claim 12, delete "NE" and insert -- NF --, therefor.

Signed and Sealed this
Seventh Day of May, 2024

Katherine Kelly Vidal
*Director of the United States Patent and Trademark Office*